United States Patent
Nagasaka et al.

(10) Patent No.: US 7,169,536 B2
(45) Date of Patent: Jan. 30, 2007

(54) MANUFACTURING METHOD AND MANUFACTURING APPARATUS OF FIELD EMISSION DISPLAY

(75) Inventors: Yukiko Nagasaka, Tenri (JP); Kazuya Kitamura, Tenri (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 574 days.

(21) Appl. No.: 10/730,676

(22) Filed: Dec. 5, 2003

(65) Prior Publication Data
US 2006/0057928 A1   Mar. 16, 2006

(30) Foreign Application Priority Data
Dec. 13, 2002   (JP)   ............... 2002-363043
Jun. 11, 2003   (JP)   ............... 2003-166800

(51) Int. Cl.
*H01J 9/02*   (2006.01)
(52) U.S. Cl. ............... 430/314; 430/315; 430/317; 430/318; 430/319; 430/321; 445/24
(58) Field of Classification Search ............... None
See application file for complete search history.

(56) References Cited

U.S. PATENT DOCUMENTS 5,735,721 A * 4/1998 Choi ............... 445/24
6,030,266 A    2/2000 Ida et al.
2003/0017423 A1 * 1/2003 Hwang et al. ............... 430/321
2003/0124869 A1 * 7/2003 Huang ............... 438/713

FOREIGN PATENT DOCUMENTS

| JP | 05-275001 | 10/1993 |
| JP | 07-094084 | 4/1995 |
| JP | 09-237565 | 9/1997 |
| JP | 216888/2001 | 8/2001 |
| JP | 124199/2002 | 4/2002 |

* cited by examiner

*Primary Examiner*—John A. McPherson
(74) *Attorney, Agent, or Firm*—Peter J. Manus; David G. Conlin; Edwards Angell Palmer & Dodge LLP

(57) ABSTRACT

A manufacturing method for a field emission display includes the steps of (1) forming a conductive film on a substrate that is to be a base plate, the conductive film being for forming a cathode electrode; (2) applying, on the conductive film, a positive resist, which is a photosensitive material; (3) exposing the positive resist to light, so as to form openings that correspond in a shape of emitters, the light being (a) emitted from a light source, (b) paralleled so that rays thereof have even light intensity distribution, and (c) directed into a micro lens array so as to be condensed in interior of the photosensitive material; and (4) forming the emitters respectively in the openings. This arrangement provides a manufacturing method for a field emission display, the method capable of highly accurately and highly productively sharp emitters aligned orderly, without a complicate manufacturing step and a complicate optical system.

15 Claims, 12 Drawing Sheets

ULTRAVIOLET LIGHT

ULTRAVIOLET LIGHT

ULTRAVIOLET LIGHT

ULTRAVIOLET LIGHT

METAL 44

ULTRAVIOLET LIGHT

FIG. 10(C) ULTRAVIOLET LIGHT

FIG. 10(F) ULTRAVIOLET LIGHT

FIG. 10(I) METAL

MANUFACTURING METHOD AND MANUFACTURING APPARATUS OF FIELD EMISSION DISPLAY

This Nonprovisional application claims priority under 35 U.S.C. § 119(a) on Patent Application No. 2002-363043 filed in Japan on Dec. 13, 2002, and Patent Application No. 2003-166800 filed in Japan on Jun. 11, 2003, the entire contents of which are hereby incorporated by reference.

FIELD OF THE INVENTION

The present invention relates to a manufacturing method and a manufacturing apparatus of a field emission display, especially to a method of manufacturing fine emitters (electron emission sections) of the field emission display in such a manner that the emitters are orderly aligned on a substrate.

BACKGROUND OF THE INVENTION

The industry of display apparatuses has studied for flat-type displays (display apparatuses) that can satisfy the demand for a thin thickness, a light weight, a large-sized screen, and fine definition. Liquid crystal displays, plasma displays, electro luminescence displays, field emission displays and the like are examples of such flat-type display. Among those, the field emission displays draw attention for their high definition and low power consumption.

An example of conventional filed emission displays is one disclosed in Japanese Publication of Unexamined Patent Application "Tokukai No. 2002-124199 (published on Apr. 26, 2002)".

In the field emission display, as shown in FIG. 11, a cathode electrode film 202 is provided on a glass substrate 201 that functions as a base plate. On the cathode electrode film 202, a large number of emitters 203 are provided in matrix. The emitters 203 are made of a metal such as molybdenum (Mo) or the like. Typically, the emitters 203 have a circular cone-shape whose peak is sharp, and has a size not more than 1 μm. Moreover, a gate electrode film 205 is provided on that portion of the cathode electrode film 202 which surrounds the emitters 203, with an insulator layer 204 sandwiched therebetween.

Above the glass substrate 201, which functions as a base plate, and on which such emitters 203 and the like are provided, a glass substrate 206 is so provided as to face the glass substrate 201. The glass substrate 206 functions as a face plate. A surface of the glass substrate 206 which faces the glass substrate 201 is coated with a fluorescent material 207. On the fluorescent material 207, an anode electrode film 208 is provided.

The glass substrate 201 functioning as the base plate and the glass substrate 206 functioning as the face plate are spaced by a spacer (not shown). A space therebetween is a vacuum gap having a present distance therebetween.

A relatively negative voltage supplied from a scanning circuit 209 is applied on the cathode electrode film 202, whereas a relatively positive voltage supplied from a control circuit 210 is applied on the gate electrode film 205. Further, a positive voltage that is higher than the voltage applied on the gate electrode film 205 is applied on the anode electrode film 208. The voltage applied on the anode electrode film 208 is supplied from an accelerating power source 211. As a result, due to an electron tunnel effect, electrons are emitted into the vacuum gap from the sharp circular cone-shaped emitters 203 by an electric field produced when a voltage is applied between the cathode electrode film 202 and the anode electrode film 208. The fluorescent material 207, which is provided on that surface of the glass substrate 206 which faces the glass substrate 201 functioning as the base plate, is struck with the electrons emitted, in pattern, from the emitters 203. As a result, the fluorescent material 207 emits light.

Incidentally, it is very important for the field emission display that the emitters 203 for emitting the electrons are aligned orderly on the glass substrate 201, for operating the field emission display without damaging the emitters 203 and uneven screen luminescence, but with improved luminescence.

Explained below is how the field emission display is manufactured, especially how the emitters are formed, referring to FIGS. 12(A) to 12(E). Here, a spin deposition method is discussed, for example.

The field emission display is manufactured as follow. To begin with, a cathode electrode film 222, an insulating film 223, and a gate electrode film 224 are formed on a glass substrate 221 that functions as a base plate, as shown in FIG. 12(A). Next, as shown in FIG. 12(B), by using, as a mask, a resist pattern formed by the photolithography, etching is carried out so as to remove the electrode film 224 and the insulating film 223 selectively, thereby forming openings 225 orderly in matrix. After that, as shown in FIG. 12(C), a sacrificial film 226 is spin-deposited so as to coat a top surface and a side surface of the gate electrode film 224. The spin deposition of the sacrificial film 226 is carried out at a low angle with respect to the glass substrate 221.

Then, as shown in FIG. 12(D), metal such as molybdenum (Mo) or the like, is deposited. The deposition of the metal is carried out vertically to the glass substrate 221. As a result, emitters 228 made of the metal such as molybdenum (Mo) or the like are formed on the cathode electrode film 222, the emitters 228 having a circular cone shape with sharp peak and having a size of not more than 1 μm, for example.

Thereafter, as shown in FIG. 12(E), the sacrificial layer 226 is etched so as to remove a metal layer 227 that is made of molybdenum (Mo) or the like and is unnecessary. Note that the spin deposition may be carried out when the emitters 228 are formed.

In this way, the emitters 228 made of the metal such as molybdenum (Mo) or the like are formed orderly on the cathode electrode film 222, the emitters 228 having a circular cone shape with sharp peak and having a size of not more than 1 μm.

Incidentally, in order to manufacture the field emission display in the above fashion, it is necessary to form the openings 225 having a fine size and being aligned orderly, and then form the emitters 228 therein. Otherwise, the emitters 228 cannot be formed with a sharp circular cone shape and fine size, and aligned orderly on the glass substrate 221. Moreover, for the formation of the emitters 228, it is necessary that the sacrificial layer 226 be formed, by the spin deposition, on the gate electrode film 224 having the openings 225 and then the emitters 228 having the sharp circular cone shape be formed in the openings 225.

Besides the above-discussed method in which the resist pattern formed by the photolithography is used as the mask, the formation of the openings 225 having a fine size can be carried out by a method suggested by Japanese Publication of Unexamined Patent Application, Tokukai No. 2001-216888 (published on Aug. 10, 2002) titled "Manufacturing method and manufacturing apparatus of field emission display". In the method suggested by this publication, a plurality of laser spots in a predetermined size are formed at once on a thin film on a substrate by using a laser and an micro lens array, so as to form openings in the thin film.

It is possible to form the openings that is orderly aligned, by using the methods of making fine openings.

Incidentally, in the conventional manufacturing methods of the field emission display, it is necessary that the emitters be formed in the openings by the spin deposition or the like method after the formation of the openings.

However, the use of the spin deposition for the formation of the emitter has such problems that, depending on conditions of the spin deposition and the like factors, the circular cone-shaped emitters thus formed may have uneven heights, uneven angles of its slope, uneven peak shapes, and the like. Such unevenness generally results in uneven field emission.

Especially, the use of the spin deposition cannot form the emitters that have a sharp peak, thereby resulting in low field emission efficiency and high power consumption.

Moreover, this largely affects reproducibility and productivity, thereby increasing cost of producing a large number of the emitters on a glass substrate.

Further, the spin deposition requires a system for accurate movement and rotation for depositing. This leads to a high cost.

Furthermore, it is necessary to form and then remove the sacrificial layer. This requires extra steps thereby increasing the cost.

SUMMARY OF THE INVENTION

The present invention has an object to provide a method and an apparatus for manufacturing a field emission display, the method and apparatus capable of highly productively and highly accurately forming sharp emitters aligned orderly, without a complicate manufacturing step and a complicate optical system.

In order to attain the object, a method of the present invention for manufacturing a field emission display, includes the step of: (1a) forming a transparent conductive film on a substrate that is to be a base plate, the transparent conductive film being for forming a cathode electrode; (2a) applying a photosensitive material on the transparent conductive film; (3a) exposing the photosensitive material to light, so as to form openings that correspond in a shape of emitters, the light being (a) emitted from a light source, (b) paralleled so that rays thereof have even light intensity distribution, and (c) directed into a micro lens array so as to be condensed in interior of the photosensitive material; and (4a) forming the emitters respectively in the openings.

In the present invention, the transparent conductive film, from which the cathode electrode is to be formed, and a photosensitive material layer are formed in this order on the substrate that is to be the base plate. The photosensitive material is exposed to the parallel light for forming the openings that correspond to the shape of the emitter, the parallel light having rays that have the even light intensity distribution, and being introduced into the micro lens array and then directed to the photosensitive material from above the substrate. In this way, the emitters are formed in the openings.

With this arrangement, it is possible to form the sharp emitters highly accurately aligned orderly in matrix in accordance with the micro lens of the micro lens array. Therefore, it is possible to enable the field emission display to operate without damaging the emitters that emit the electrons, and with improved brightness by inhibiting occurrence of uneven brightness.

Furthermore, the openings that correspond to the shape of the emitters are formed simply by the exposure of the photosensitive. Thus, it is possible to omit the step of the spin coating method or the like, thereby improving the overall throughput of the manufacturing process. Further, the present invention eliminates necessity of (a) an expensive apparatus for the spin deposition, such as a high resolution exposure apparatus and the like, and (b) a system that performs highly accurate movement and rotation for the spin deposition, thereby preventing cost increase.

Moreover, the use of the parallel light whose rays have the even light intensity distribution, allows to use a substrate having a large area, thereby improving manufacturing efficiency.

As a results, it is possible to provide such a manufacturing method for a field emission display, that is capable of highly accurately and highly productively forming the sharp emitters orderly aligned without a complicate manufacturing step and a complicate optical system.

Moreover, in order to attain the object, a method of the present invention for manufacturing a field emission display, includes the steps of: (1b) forming, on a substrate to be a base plate, a conductive film from which a cathode electrode is to be formed, and forming, on the conductive film, an emitter formation layer from which emitters are to be formed; (2b) applying a photosensitive material on the emitter formation layer; (3b) exposing the photosensitive material to light so as to form pre-emitter shapes that correspond to a shape of the emitters and are to be emitters, the light being (a) emitted from a light source, (b) paralleled so that rays thereof have even light intensity distribution, (c) directed into a micro lens array so as to be condensed in interior of the photosensitive material so that the photosensitive material is given intensity distribution that corresponds to the shape of the emitters; (4b) performing development so as to remove the photosensitive material and bare the pre-emitter shapes on the emitter formation layer; and (5) transferring the per-emitter shapes to the emitter formation layer.

In the present invention, the pre-emitter shapes are formed directly on the emitter formation layer. Thus, it is possible to omit the step of the spin coating method or the like, thereby improving the overall throughput of the manufacturing process. Further, the present invention eliminates necessity of (a) an expensive apparatus for the spin deposition, such as a high resolution exposure apparatus and the like, and (b) a system that performs highly accurate movement and rotation for the spin deposition, thereby preventing cost increase.

Moreover, (i) the conductive film, from which the cathode electrode is to be formed, (ii) the emitter formation layer, from which the emitters are formed, and (iii) a photosensitive material layer, are formed in this order on the substrate that is to be the base plate. Then, the photosensitive material is exposed to the light being (a) emitted from a light source, (b) paralleled so that rays thereof have even light intensity distribution, (c) directed into a micro lens array so as to be condensed in interior of the photosensitive material so that the photosensitive material is given intensity distribution that corresponds to the shape of the emitters. The exposure forms the pre-emitter shapes (from which the emitters will be formed). The development is performed so as to bare the pre-emitter shapes on the emitter formation layer. Then, the pre-emitter shapes are transferred to the emitter formation layer.

With this arrangement, it is possible to form the sharp emitters highly accurately aligned orderly in matrix in accordance with the micro lens of the micro lens array. Therefore, it is possible to enable the field emission display to operate without damaging the emitters that emit the electrons, and with improved brightness by inhibiting occurrence of uneven brightness.

As a results, it is possible to provide such a manufacturing method for a field emission display, that is capable of highly accurately and highly productively forming the sharp emitters orderly aligned without a complicate manufacturing step and a complicate optical system.

In order to attain the object, a method of the present invention of manufacturing a field emission display, includes the steps of: (7) (i) forming, on a substrate to be a base plate, a conductive film from which a cathode electrode is to be formed, (ii) forming, on the conductive film, an emitter formation layer from which emitters are to be formed, and (iii) forming a catalyst layer from which a carbon nanotube is to be formed on the emitter formation layer; (8) applying a photosensitive material on the catalyst layer; (9) exposing the photosensitive material to light so as to form pre-emitter shapes that correspond to a shape of the emitters and are to be emitter, the light being (a) emitted from a light source, (b) paralleled so that rays thereof have even light intensity distribution, (c) directed into a micro lens array so as to be condensed in interior of the photosensitive material so that the photosensitive material is given intensity distribution that corresponds to the shape of the emitters; (10) performing development so as to remove the photosensitive material and bare the pre-emitter shapes on the catalyst layer; (11) transferring the pre-emitter shapes to the emitter formation layer and the catalyst layer; and (12) forming the carbon nanotube on the catalyst layer.

In the present invention, the pre-emitter shapes are formed directly on the emitter formation layer. Thus, it is possible to omit the step of the spin coating method or the like, thereby improving the overall throughput of the manufacturing process. Further, the present invention eliminates necessity of (a) an expensive apparatus for the spin deposition, such as a high resolution exposure apparatus and the like, and (b) a system that performs highly accurate movement and rotation for the spin deposition, thereby preventing cost increase.

Further, the catalyst layer, from which the carbon nanotubes are formed, is formed on the emitter formation layer. The carbon nanotubes are formed on the catalyst layer (catalyst layer section) of the emitters. With this arrangement, it is possible to attain sharper emitters than the metal emitters, thereby improving field emission efficiency and attaining lower power consumption. Moreover, excellent chemical safety of the carbon nanotubes provides the emitters with better performance and a longer life.

Furthermore, because the carbon nanotubes are formed directly on the catalyst layer, it is possible to omit a step of fixing separately prepared carbon nanotubes on the peak sections by an adhesive agent or the like. This attains a better production efficiency and a lower cost.

Furthermore, in order to attain the object, an apparatus of the present invention for manufacturing a field emission display, the apparatus being for use in the aforementioned methods for manufacturing the field emission display, and including: the light source for emitting the light of wavelengths including a wavelength to which the photosensitive material is sensitive; a lens for paralleling the light emitted from the light source; and the micro lens array for condensing the light thus paralleled by the light source so as to form a plurality of the pre-emitter shapes from the photosensitive material applied on the substrate that is to be the base plate.

In the present invention, the light emitted from the light source is paralleled so that the rays of the light have the even light intensity distribution. Thus, it is possible to use a substrate having a large area. Moreover, the use of the micro lens array enables to form the plurality of emitters at once. This improves efficiency of the production of the field emission display.

Therefore, it is possible to provide such a manufacturing apparatus for a field emission display, that is capable of highly accurately and highly productively forming the sharp emitters orderly aligned without a complicate manufacturing step and a complicate optical system.

For a fuller understanding of the nature and advantages of the invention, reference should be made to the ensuing detailed description taken in conjunction with the accompanying drawings.

BRIEF DESCRIPTION OF THE DRAWINGS

FIGS. 10(A) to 10(K) are cross-sectional views illustrating yet still another embodiment of the manufacturing method of the present invention for manufacturing the field emission display, the views showing steps of the manufacturing method.

DESCRIPTION OF THE EMBODIMENTS

First Embodiment

Figure 1:
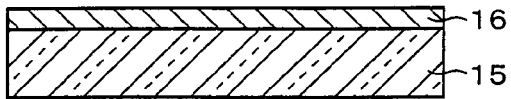
FIGS. 1(A) to 1(J) are cross-sectional views illustrating an embodiment of a manufacturing method of the present invention for manufacturing an field emission display, the views respectively showing steps of the manufacturing method.
Figure 1:
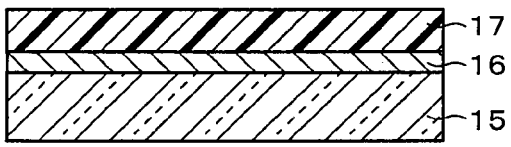
Figure 1:
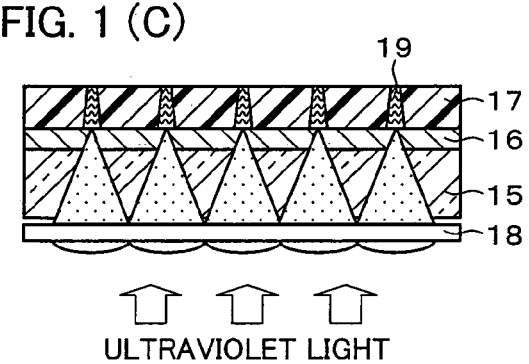
Figure 1:
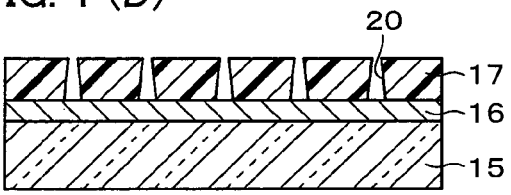
Figure 1:
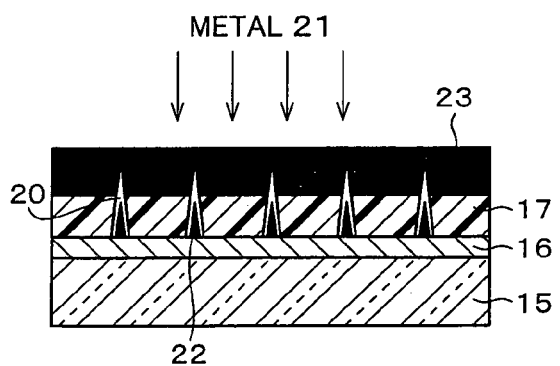
Figure 1:
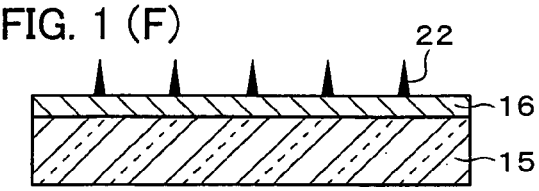
Figure 1:
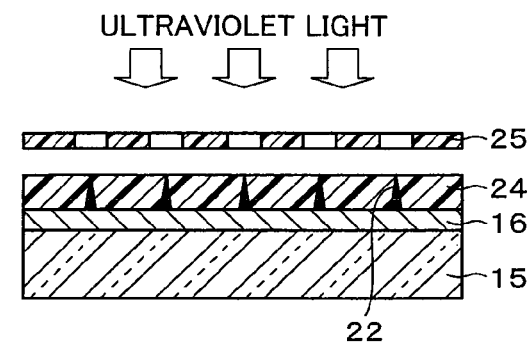
Figure 1:
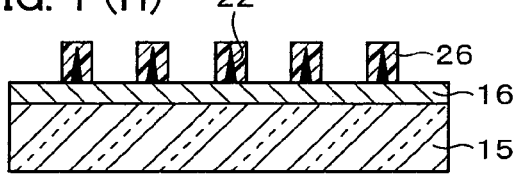
Figure 1:
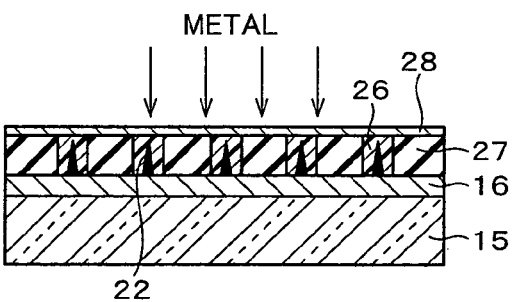
Figure 1:
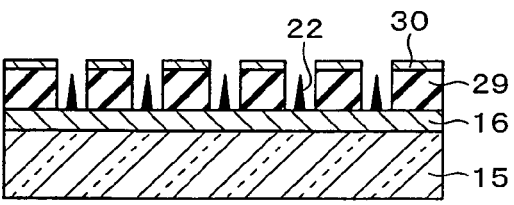

An embodiment of the present invention is described below, referring to FIGS. 1 to 3. Note that a field emission display discussed in the present embodiment has the same structure as the one discussed in "BACKGROUND OF THE INVENTION". Thus, explanation thereof is omitted here.

Figure 2:
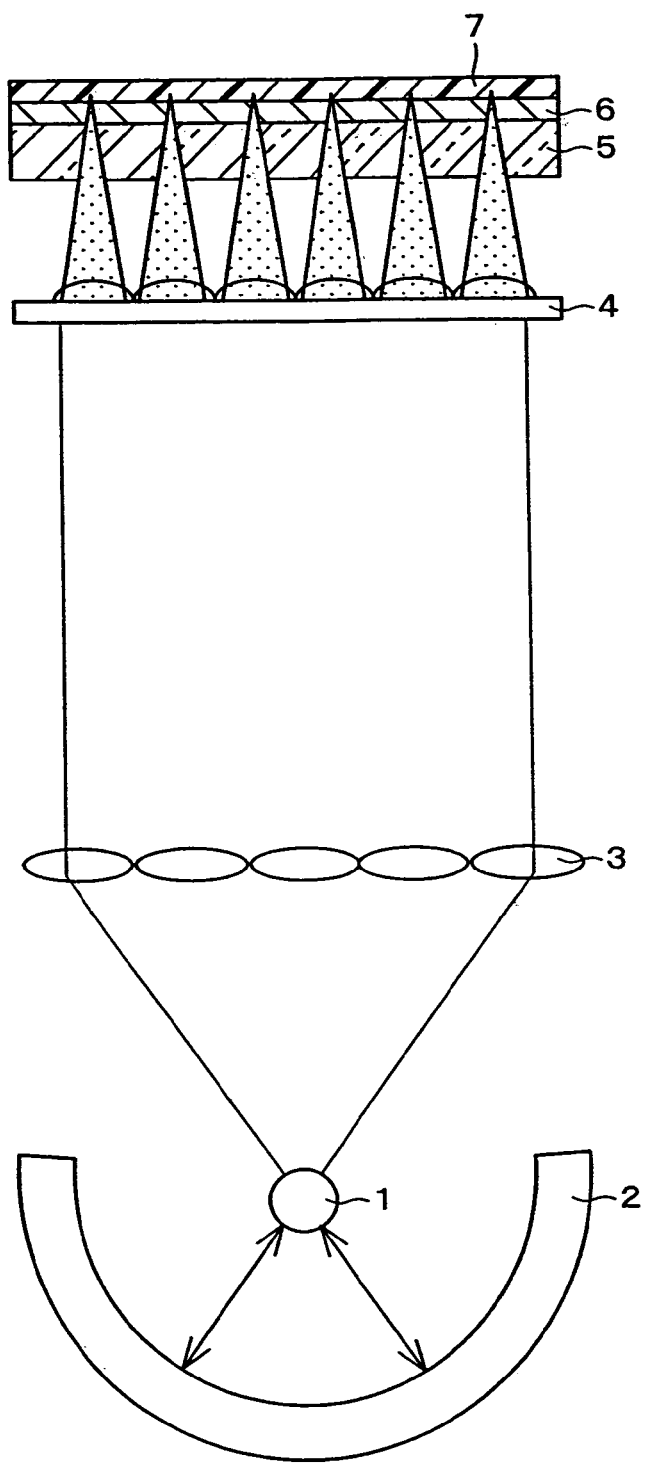
FIG. 2 is a structural view of an exposure apparatus as a manufacturing apparatus for use in making circularly cone pre-emitter shapes to be emitters in the manufacturing method of the field emission display.

A manufacturing method of the present embodiment for manufacturing the field emission display is so arranged that, as shown in FIG. 2, a positive resist is used as a photosensitive material 7 and the positive resist is exposed to light condensed thereon by a micro lens array 4, so as to form openings having a shape corresponding to a circular cone shape that emitters will have.

In this way, it is possible to form the emitters in the openings without forming the sacrificial layer that is necessary for the formation of the openings in the conventional methods disclosed in Japanese Publications of Unexamined Patent Applications, Tokukai, No. 2002-124199, and Tokukai, No. 2001-216888.

To begin with, an exposure optical system for manufacturing the opening having the shape of the emitters of the field emission display, referring to FIG. 2. Note that, as described above, the emitters of the field emission display of the present embodiment have a circular cone shape having a sharp peak.

As shown in FIG. 2, the exposure apparatus is provided with a light source 1, a condensing mirror 2, fly eye lenses 3, and the micro lens array 4. The light source 1 is a ultraviolet light source for emitting light including wavelength of 365 nm.

Light emitted from the light source 1 is paralleled so that rays thereof have even light intensity distribution, by the condensing mirror 2 and the fly eye lenses 3. The parallel light is directed into the micro lens array 4. In a vicinity of focus points of the micro lens array 4, a glass substrate 5 is provided. On the glass substrate 5, provided is a cathode electrode formation layer 6 in which a cathode electrode section of the field emission display is to be formed. The glass substrate 5 is so provided to face toward the light source 1. The cathode electrode formation layer 6 is coated with a photosensitive material 7 that is sensitive to light of the wavelength of 365 nm.

The photosensitive material 7 is exposed to the light condensed by the micro lens array 4, thereby producing openings for a shape of emitters. Specifically speaking, compared with the method of forming the openings disclosed in Japanese Unexamined Patent Application "Tokukai No. 2002-124199" and the like in which the openings having a circular column shape are formed, the present embodiment is so arranged that the holes formed in the present embodiment have a circular trapezoid shape whose surface in contract with a conductive film has a large area, and whose opposite surface has a small area, the conductive film functioning as a cathode electrode film. Thus, it is possible to form the emitters in the openings without forming a sacrificial layer.

Referring to FIGS. 1(A) to 1(J), the following specifically explains the manufacturing method of the present embodiment for manufacturing the field emission display by using the exposure apparatus.

As shown in FIG. 1(A), a transparent conductive film 16 is formed on a glass substrate 15. The transparent conductive film 16 is a transparent conductive film that is to be the cathode electrode film. The glass substrate 15 functions as a base plate and a substrate. Here, it is necessary that the conductive film 16 be made of a raw material that is highly transparent with respect to ultraviolet light. Thus, in the present embodiment, an ITO (Indium Tin Oxide) film having 0.2 μm thickness is formed as the conductive film 16 by the sputtering method.

Next, as shown in FIG. 1(B), a positive resist 17 as the photosensitive material is applied on the conductive film 16. Here, the positive resist 17 is a photosensitive material that is broken down by light radiation so that the photosensitive material becomes soluble to a developing solution and can be removed from a surface of the substrate in developing. In the present embodiment, the positive resist 17 is applied to a thickness of 3.0 μm by the spin coating method. The positive resist 17 has a resolution of not more than 1 μm, as high as that of a negative resist. Thus, by using the positive resist 17, it is possible to form fine patterns. Moreover, the positive resist 17, which is for use in the etching process generally, is highly reliable.

Next, as shown in FIG. 1(C), the positive resist 17 is exposed to the light that is directed thereto via the micro lens array 18 from above the glass substrate 15.

Referring to FIGS. 3(A) and 3(B), a structure of the micro lens array 18 used in the present embodiment is explained below.

The micro lens array 18 of the present embodiment is so structured that, as shown in FIGS. 3(A) and 3(B), micro lenses each having a hexagon shape are placed in the micro lens array with no gap therebetween. This structure enables such a design that the micro lenses have a large diameter. Thus, even in case where a long focal distance is required, it is possible to have a large N.A (Numerical Aperture) of the micro lenses, whereby spot diameters at the focal points can be small. Note that the N.A of the micro lenses is a numerical value that determines a limit of resolution of a lens that requires high resolution, such as an object lens for microscope. The N.A is defined by:

$$N.A = n \times \sin u,$$

where u is a solid angle of an object, n is a refraction factor between the lens and the object.

Positions of the openings for pre-emitter shapes to be the emitters match with positions of the micro lens of the micro lens array 18. An inscribed circle of each micro lens has a diameter of 10.0 μm. A focal distance of each micro lens is 27.4 μm. In the micro lens array 18, the micro lenses are positioned with a pitch of 10.0 μm, the pitch being a distance between each center of two micro lenses.

As shown in FIG. 1(C), the light source 1 is a source for a ultraviolet light including a wavelength of 365 nm, to which the positive resist 17 is sensitive. The light emitted from the light source 1 has rays whose light intensity distribution is the same. The light is directed into the micro lens array 18 provided between the light source 1 and the glass substrate 15. Here, it is so set that the light from the light source 1 is directed from above the glass substrate 15 in such a manner that the focal points thereof are in a vicinity of an interface between the conductive film 16 and the positive resist 17. With this setting, formed on in the positive resist 17 are sharpest-possible circular cone pre-emitter shapes whose peaks point opposite to the glass substrate 15.

Here, if the exposure is carried out for a longer time so as to form a tip portion of the intensity distribution of the micro lens array 18 outside of the positive resist 17 (see FIG. 2), the exposure of the positive resist 17 produces such circular trapezoid shapes 19 whose surface (hereinafter, referred to as a bottom surface) in contact with the conductive film 16 has a large area, and whose opposite surface (hereinafter, referred to as a top surface) has a small area.

Next, as shown in FIG. 1(D), development is carried out so that openings 20 having a circular trapezoid shape are formed on the conductive film 16. Here, formed are openings 20 having a bottom surface diameter 2.0 µm, a top surface diameter of 1.4 µm, and a height of 3.0 µm.

Next, as shown in FIG. 1(E), a metal 21 such as molybdenum (Mo) or the like is deposited vertically to the glass substrate 15. In this way, emitters 22 having a circular cone shape are formed within the openings 20 having the circular cone shape. The thus obtained emitters 22 having the circular cone shape have a diameter of 1.2 µm, and a height of 2.5 µm.

Thereafter, as shown in FIG. 1(F), an unnecessary metal 23, which is such as molybdenum (Mo) or the like, and is deposited on a surface of the positive resist 17, is peeled off together with the positive resist 17. This peeling is carried out by soaking the layers into a sodium hydroxide aqueous solution of 2% concentration for an appropriate length of time.

Next, an insulating layer 29 and a gate electrode film 30 are formed around each emitters having the circular cone shape, by using a lift-off method and a sputtering method in combination. In the present embodiment, a glass paste layer is formed as the insulating layer 29, whereas a chromium film is formed as the gate electrode film 30.

More specifically, as shown in FIG. 1(G), a negative resist 24 is applied on the conductive film 16 and the emitters 22, by the spin coating method. Then, the negative resist 24 is exposed to light by using a mask 25 having circular openings that are of 2 µm diameter and are positioned in accordance with the positions of the micro lenses of the micro lens array 18. Here, positional matching between the mask 25 and the micro lens array 18 can be carried out by using alignment marks (not shown) marked in advance and checking, by using the exposure apparatus in exposing, whether or not they are matched.

Thereafter, as shown in FIG. 1(H), development is carried out so that a negative resist layer 26 is formed on the emitters 22, whereas that part of the conductive film 16 which is not associated with the emitters 22 is left uncovered.

Next, as shown in FIG. 1(I), a glass paste 27 is applied thereon all over by a screen printing method, for planarization. Then, a chromium film 28 is formed thereon by the sputtering method.

Thereafter, as shown in FIG. 1(J), the negative resist layer 26 and the chromium film 28 formed on the emitters 22 are peeled off. This peeling is carried out by soaking the layers into a sodium hydroxide aqueous solution of 10% concentration for an appropriate length of time. As a result, the insulting layer 29 formed from the glass paste 27 and the gate electrode film 30 formed from the chromium film 28 are formed around the emitters 22. In the present embodiment, the insulating layer 29 thus formed has a thickness of 1.0 µm and the gate electrode film 30 thus formed has a thickness of 0.2 µm.

According to the present embodiment, as described above, the use of the positive resist 17 enables the formation of the openings 20 having a shape corresponding to the shape of the emitter 22. The openings 20 having the shape corresponding to the shape of the emitter 22 are so arranged that the top surfaces thereof has a smaller area than the bottom surfaces thereof. Because of this, the step of forming the sacrificial layer by using the spin deposition method or the like can be omitted, thereby improving overall throughput of the manufacturing process.

Moreover, it is possible to solve problems caused by the conditions and the like in the spin deposition method. Such problems are, namely, (i) deterioration of evenness in field emission due to uneven heights, uneven angles of slopes, and uneven shapes of the peaks (peak shapes), (ii) deterioration of field emission efficiency and increase in power consumption due to non-sharp peaks.

Further, this eliminates necessity of system for highly accurately moving and rotating an apparatus for the spin deposition, thereby attaining a significant cost reduction.

Furthermore, the intensity distribution that matches with the shape of the emitters 22 is produced by using the micro lens array 18 provided between the light source 1 and the glass substrate 15 on which the conductive film 16 is provided. The positive resist 17 on the conductive film 16 is exposed to the light directed thereto via the micro lens array 18 from above the glass substrate 15, thereby forming the openings 20 in which the emitters 22 are to be formed. Thereafter, the metal such as molybdenum (Mo) or the like is vertically deposited so a to form the emitters 22.

This arrangement forms the emitters 22 highly accurately aligned in matrix in accordance with the positions of micro lenses of the micro lens array 18. With this arrangement, therefore, it is possible to enable the field emission display to operate without damaging the emitters 22 that emit the electrons and with improved brightness by inhibiting occurrence of uneven brightness.

Second Embodiment

Figure 4:
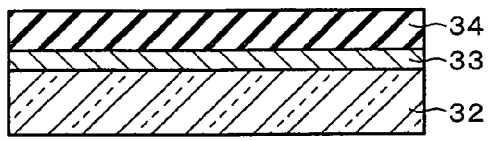
FIGS. 4(A) to 4(J) are cross-sectional views illustrating another embodiment of the manufacturing method of the present invention for manufacturing the field emission display, the views showing steps of the manufacturing method.
Figure 4:
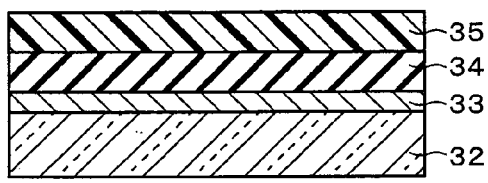
Figure 4:
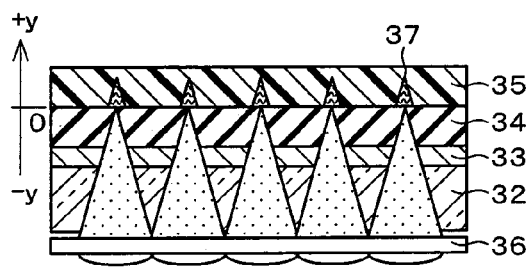
Figure 4:
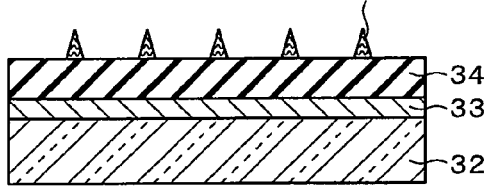
Figure 4:
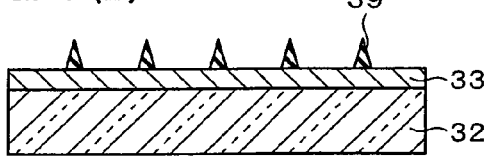
Figure 4:
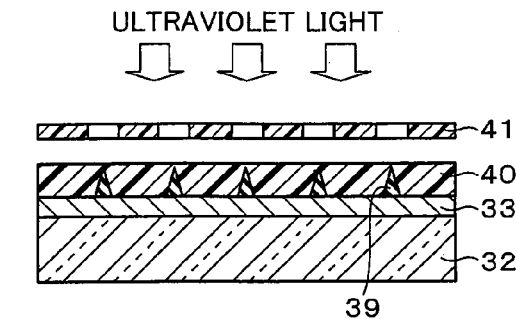
Figure 4:
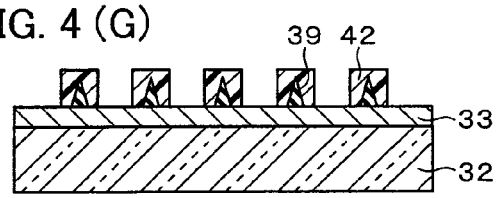
Figure 4:
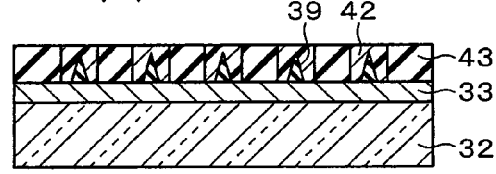
Figure 4:
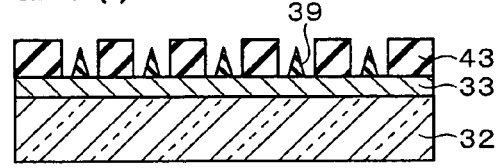
Figure 4:
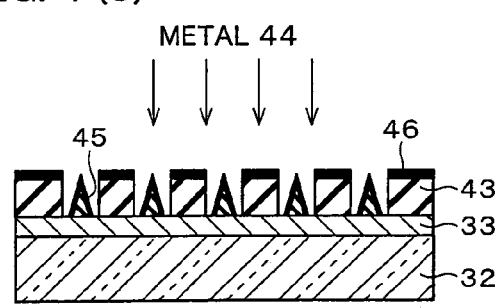

Described below is another embodiment of the present invention, referring to FIG. 4. Note that members having the same functions as the members illustrated in the first embodiment are labeled in the same fashion and their explanation is omitted here for the sake of easy explanation. Moreover, in the present invention, an exposure optical system for producing a shape of emitters of the field emission display is arranged similarly with the one illustrated in FIG. 2 of the first embodiment.

In a manufacturing method of the present embodiment for manufacturing a field emission display, a negative resist 35 is used as a photosensitive material. The negative resist 35 is exposed to light condensed by a micro lens array 36, so as to form pre-emitter shapes of emitters 39. By etching, the pre-emitter shapes of the emitters 39 (the pre-emitter shapes to be the emitters 39) are transferred to an emitter formation layer 34 that is formed from an insulating film. (The emitter formation layer is a layer in which the emitters are to be formed.) After that, a metal is deposited in the pre-emitter shapes of the emitters 39, thereby forming emitters 45.

Moreover, as in the first embodiment, the micro lens array 36 is designed such that a gap between each lens is eliminated so at to have a large diameter of the micro lenses, thereby enabling easy production of the micro lens array 36.

As a result, with such design that the micro lenses have a large diameter, it is possible to have a large N.A of the micro lenses even if a long focal distance is necessary. Thus, it is possible to have a small spot diameter at focal points.

Referring to FIGS. 4(A) to 4(J), a manufacturing method of the present embodiment for manufacturing a field emission display is explained below specifically.

To begin with, as shown in FIG. 4(A), a conductive film 33 and the emitter formation layer 34 are formed on a glass substrate 32 as a base plate. A cathode electrode film will be formed from the conductive film 33. Here, it is necessary that the conductive film 33 and the emitter formation layer 34 be made of a material that is highly transparent to ultraviolet light. Thus, in the present embodiment, an ITO film of 0.2 µm thickness is formed as the conductive film 33 by the sputtering method, then a SiO$_2$ film of 3.0 µm thickness is formed as the emitter formation layer 34 by the plasma CVD (Chemical Vapor Deposition) method.

Next, as shown in FIG. 4(B), the negative resist 35 that functions as a photosensitive material is applied on the emitter formation layer 34. Here, the negative resist 35 is a photosensitive material that is polymerized or bridged by light radiation so that the photosensitive material becomes insoluble or hardly soluble to a developer and can be remained on a surface of a substrate after development. In the present embodiment, the negative resist 35 is applied to a thickness of 1.5 µm by the spin coating method.

Next, as shown in FIG. 4(C), the negative resist 35 is exposed to light directed thereto via the micro lens array 36 and the glass substrate 32. The light source 1 is a ultraviolet light source for emitting light having a wavelength of 365 nm to which the negative resist 35 is sensitive. The light emitted from the light source 1 is paralleled so that rays thereof have even light intensity distribution, and directed into the micro lens array 36 provided between the light source 1 and the glass substrate 32.

Here, the micro lens array 36 is identical with the one used in the first embodiment. The micro lens array 36 is so arranged that each lens has an inscribed circle of 10.0 µm diameter, a focal distance of 27.4 µm, and is placed with a pitch of 10.0 µm.

Next, the exposure shown in FIG. 4(C) is described.

In a vicinity of a focal point of each micro lens, light intensity is so distributed that the light intensity is strongest and a beam diameter is smallest at the focal point (y=0), and that a point farer from the focal point has a weaker light intensity. As a result, a gaussian shape is obtained. Moreover, the intensity distribution at the focal points is distributed in an elliptical shape along ±y direction, so that the point farer from the focal point has weaker intensity, where the y direction is an emission direction from the micro lens. In the present embodiment, the circular cone shape is formed by using the intensity distribution along the emission direction (+y direction).

Therefore, as shown in FIG. 4(C), the light from the light source 1 is directed to the negative resist 35 via the glass substrate 32 in such a manner that the focal points of the micro lens array 36 are in the vicinity of an interface between the emitter formation layer 34 and the negative resist 35, whereby sharpest possible circular cones (circular cone pre-emitter shapes) 37 are formed on the negative resist 35. Peaks of the circular cones 37 point opposite to the glass substrate 32. In order to attain such sharp pre-emitter shapes, the focal points are set in consideration to a coefficient of absorption of the negative resist 35 and a change in light transmissivity before and after hardening of the negative resist 35.

Next, as shown in FIG. 4(D), emitters 38 having the sharp circular cone shape are formed on the emitter formation layer 34. Here, the emitters 38 have a circular cone shape of 2.0 µm diameter and 1.5 µm height.

Next, as shown in FIG. 4(E), the circular-cone shaped emitters 38 made of the negative resist 35 are transferred to a SiO$_2$ film that is an insulating film functioning as an emitter formation layer 34, thereby producing circular cone-shaped emitters 39 formed from SiO$_2$ film. Here, it is possible to obtain a sharper circular cone by arranging such that a selection ratio of the emitter formation layer 34 with respect to the negative resist 35 is more than 1. Here, the selection efficiency is 2, whereby the emitters 39 have a 2 µm diameter and a 3.0 µm height, and are highly accurately alighted orderly in matrix.

Next, as shown in FIGS. 4(F) to 4(J), an insulating layer 43 and a gate electrode film 46 are formed around the emitters 39 having the circular cone shape, by using the lift-off method and the sputtering method. In the present embodiment, a glass paste layer is used as the insulating layer 43 and a chromium film is used as the gate electrode film 46

More specifically, as shown in FIG. 4(F), a negative resist 40 is applied on the conductive film 33 and the emitters 39 by the spin coating method. Then, the negative resist 40 is exposed by using a mask 41 having circular openings having a 3.0 µm diameter and positioned in accordance with the micro lenses of the micro lens array 36. Here, positional matching between the mask 41 and the micro lens array 36 can be carried out by using alignment marks (not shown) marked in advance and checking, by using the exposure apparatus in exposing, whether or not they are matched.

Thereafter, as shown in FIG. 4(G), development is carried out so that a negative resist layer 42 is formed on the emitters 39, whereas that part of the conductive film 33 which is not associated with the emitters 39 is left uncovered.

Next, as shown in FIG. 4(H), a glass paste that is to be an insulating layer 43 is applied thereon all over by a screen printing method, for planarization.

Then, the negative resist layer 42 formed on the emitters 39 is peeled off. This peeling is carried out by soaking the layers into a sodium hydroxide aqueous solution of 10% concentration for an appropriate length of time. As a result, as shown in FIG. 4(I), the insulating layer 43 made of a glass paste layer is formed around the emitters 39. In the present embodiment, the insulating layer 43 thus formed has a thickness of 1.6 µm.

Next, as shown in FIG. 4(J), a conductive material is applied on the emitters 39 that is formed from the SiO$_2$ film that is an insulating film. In this way, emitters 45 are formed. Here, the formation of the emitters 45 is carried out by depositing molybdenum (Mo) vertically with respect to the glass substrate 32. At the same time, a molybdenum (Mo) film is formed on the insulating layer 43, which is made of the glass paste and formed around the emitters 39. The molybdenum (Mo) film functions as a gate electrode film 46. It is possible to change a contact area between the emitters 45 and the conductive film 33 by changing an amount of metal to be deposited. The thus formed emitters 45 are highly accurately aligned orderly in matrix, and have a sharp shape.

The emitter formation layer 34 may be made of a conductive material, whereas the emitter formation layer 34 is made of an insulating material in the present embodiment. In case the emitter formation layer 34 is made of a conductive material, the process is so arranged that, in the step of lifting off, the insulating layer 43 and the gate electrode film 46 are formed around the emitters 39 and the resist is peeled off, as described in a third embodiment later discussed.

As described above, according to the present embodiment, the pre-emitter shapes of the emitters 39 are transferred to the emitter formation layer 34 by etching, the emitter formation layer 34 being an insulating layer. This enables to omit the step of the spin deposition or the like, thereby improving overall throughput of the manufacturing process.

Moreover, it is possible to solve problems caused by the conditions and the like in the spin deposition method. Such problems are, namely, (i) deterioration of evenness in field emission due to uneven heights, uneven angles of slopes, and uneven shapes of the peaks, (ii) deterioration of field emission efficiency and increase in power consumption due to non-sharp peaks.

Further, this eliminates necessity of system for highly accurately moving and rotating an apparatus for the spin deposition, thereby attaining a significant cost down.

Furthermore, the intensity distribution that matches with the shape of the emitters 39 is produced by using the micro lens array 36 provided between the light source 1 and the glass substrate 32 on which the emitter formation layer 34 and the conductive film 33 as the cathode electrode film are formed. The negative resist 35 on the emitter formation layer 34 is exposed to the light directed thereto via the glass substrate 32, thereby forming circular cone pre-emitter shapes 37 for the emitters 39. Thereafter, the pre-emitter shapes 37 of the emitters 39 are transferred to the emitter formation layer 34 by etching. This arrangement forms the sharp emitters 39 highly accurately aligned in matrix in accordance with the positions of the micro lenses of the micro lens array 36.

With this arrangement, therefore, it is possible to enable the field emission display to operate without damaging the emitters 45 that emit the electrons, and with improved brightness by inhibiting occurrence of uneven brightness.

Furthermore, by depositing a metal such as the molybdenum (Mo) or the like vertically with respect to the glass substrate 32, it is possible to concurrently form the emitters 45 and the gate electrode film 46 that is on the insulating layer 43. Moreover, the emitters 45 are formed by depositing the metal on the circular cones formed in the emitter formation layer 34. With this arrangement, it is possible to significantly reduce the time necessary for the formation of the emitters 45, compared with the arrangement in which the whole part of the emitters is formed by depositing. This significantly improves the overall throughput of the manufacturing process.

Third Embodiment

Figure 5:
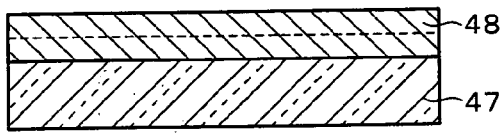
FIGS. 5(A) to (I) are cross-sectional views illustrating still another embodiment of the manufacturing method the present invention for manufacturing the field emission display, the views showing steps of the manufacturing method.
Figure 5:
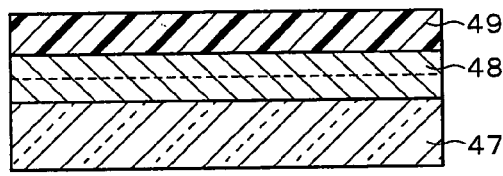
Figure 5:
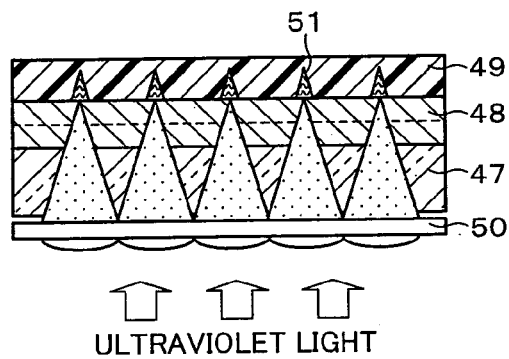
Figure 5:
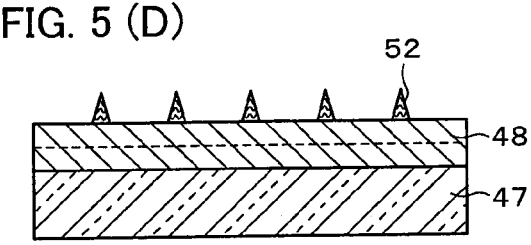
Figure 5:
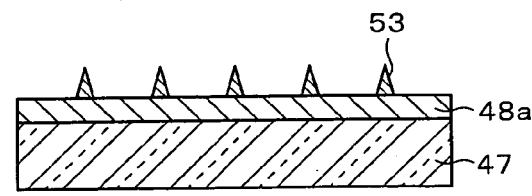
Figure 5:
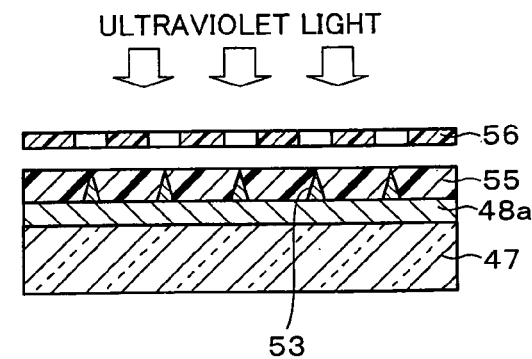
Figure 5:
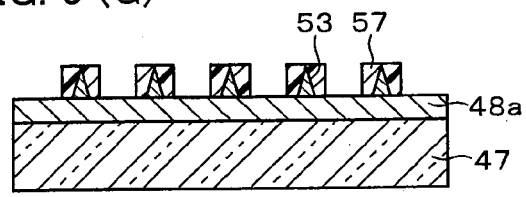
Figure 5:
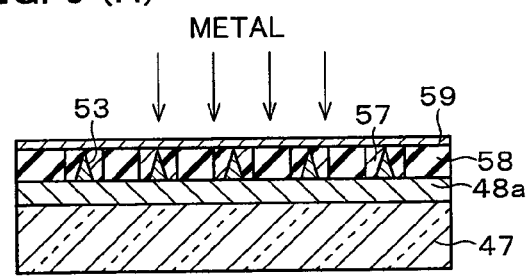
Figure 5:
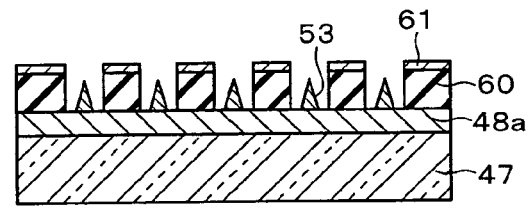

Described below is still another embodiment of the present invention, referring to FIG. 5. Note that members having the same functions as the members illustrated in the first and second embodiments are labeled in the same fashion and their explanation is omitted here for the sake of easy explanation. Moreover, in the present invention, an exposure optical system for producing a shape of emitters of the field emission display is arranged similarly with the one illustrated in FIG. 2 of the first embodiment.

As shown in FIGS. 5(A) to 5(I), a manufacturing method of the present embodiment for manufacturing a field emission display is arranged as follows. A conductive layer 48 includes an emitter formation layer and a conductive layer as a cathode electrode film 48a. The emission formation layer and the cathode electrode film are made of the same conductive material. A negative resist 49, which is made of a photosensitive material is exposed to light condensed by a micro lens array, so as to form pre-emitter shapes of emitters 53. In the manufacturing method, a step of transferring the pre-emitter shapes of the emitters 53 to the emitter formation layer by etching is so carried out that the etching is stopped so that a film thickness of the cathode electrode film 48a is left, so as to form the cathode electrode film 48a and the emitters 53 concurrently.

Referring to FIGS. 5(A) to 5(I), described specifically below is the manufacturing method of the present embodiment for manufacturing the field emission display.

To begin with, as shown in FIG. 5(A), a conductive film as a cathode electrode film and a conductive film as the emitter formation layer are formed on a glass substrate 47 functioning as a base plate. In the present embodiment, the cathode electrode film and the emitter formation layer are made of the same raw material, and are formed as the conductive layer 48 integrally as one layer. Here, it is necessary that the conductive layer 48 is made of a material that is highly transparent with respect to ultraviolet light. Thus, in the present embodiment, an ITO film of 3.5 μm thickness is formed by the sputtering method.

Next, as shown in FIG. 5(B), a negative resist 49 as a photosensitive material is applied on the conductive film 48. In the present embodiment, the negative resist 49 is applied to 2.0 μm thickness by the spin coating method.

Next, the negative resist 49 is exposed to light that is directed thereto via a micro lens array 50 from above the glass substrate 47. The micro lens array 50 used in the present embodiment is identical with the one used in the first embodiment. The micro lens array 50 is so arranged that each lens has an inscribed circle of 10.0 μm diameter, a focal distance of 27.4 μm, and is placed with a pitch of 10.0 μm.

Here, as shown in FIG. 5(C), the light from the light source 1 is directed to the negative resist 49 via the glass substrate 47 in such a manner that focal points of the micro lens array 50 are in the vicinity of an interface between the conductive layer 48 and the negative resist 49, whereby sharpest possible circular cones (circular cone pre-emitter shape) 51 are formed. Peaks of the circular cones 51 are positioned opposite to the glass substrate 47. As in the second embodiment, the focal points are set in consideration to a coefficient of absorption of the negative resist 49 and a change in light transmissivity before and after hardening of the negative resist 49.

Next, as shown in FIG. 5(D), emitters 52 having the sharp circular cone shape are formed on the conductive layer 48. Here, the emitters 52 have a circular cone shape of 2.0 μm diameter and 1.5 μm height.

Then, as shown in FIG. 5(E), the circular-cone shaped emitters 52 made of the negative resist 49 are transferred to the conductive layer 48 by dry etching, thereby obtaining emitters 53 made of ITO and having the circular cone shape. Here, the etching is stopped so that the conductive layer 48 has a thickness of 0.5 μm from the glass substrate 47. A 0.5 μm thickness of the conductive layer 48 is the cathode electrode film 48a.

Here, it is possible to obtain a sharper circular cone by arranging such that a selection ratio of ITO with respect to the negative resist 49 is more than 1. Here, the selection efficiency is 2, whereby the emitters 53 have a 2 μm diameter and a 3.0 μm height, and are highly accurately alighted orderly in matrix.

Next, as shown in FIG. 5(F) to 5(I), an insulating layer 60 and a gate electrode film 61 are formed around the emitters 53 having the circular cone shape, by using the lift-off method and the sputtering method. In the present embodiment, a glass paste layer is used as the insulating layer 60 and a chromium film as the gate electrode film 61

More specifically, as shown in FIG. 5(F), a negative resist 55 is applied on the cathode electrode film 48a and the emitters 53 by the spin coating method. Then, the negative resist 55 is exposed by using a mask 56 having the circular openings having a 3.0 μm diameter and positioned in accordance with the micro lenses of the micro lens array 50. Here, positional matching between the mask 56 and the micro lens array 50 can be carried out by using alignment marks (not shown) marked in advance and checking, by using the exposure apparatus in exposing, whether or not they are matched.

Thereafter, as shown in FIG. 5(G), development is carried out so that a negative resist layer 57 is formed on the emitters 53, whereas that part of the cathode electrode film 48a which is not associated with the emitters 53 is left uncovered.

Next, as shown in FIG. 5(H), a glass paste 58 is applied thereon all over by a screen printing method, for planarization. Further, a chromium film 59 is formed thereon by the sputtering method.

Then, the negative resist layer 57 and the chromium film 59 formed on the emitters 53 are peeled off. This peeling is carried out by soaking the layers into a sodium hydroxide aqueous solution of 10% concentration for an appropriate length of time. As a result, as shown in FIG. 5(I), (a) an insulating layer 60 made of a glass paste layer, and (b) a gate electrode film 61 are formed around the emitter 53. In the present embodiment, the insulating layer 60 thus formed has a thickness of 3.1 μm, and the gate electrode film 61 thus formed has a thickness of 0.3 μm The emitters 53 thus formed are highly accurately aligned orderly in matrix and having a sharp shape.

As described above, according to the present embodiment, the pre-emitter shapes of the emitters 53 are transferred to the conductive layer 48 by etching. This enables to omit the step of the spin deposition or the like, thereby improving overall throughput of the manufacturing process.

Moreover, it is possible to solve problems caused by the conditions and the like in the spin deposition method. Such problems are, namely, (i) deterioration of evenness in field emission due to uneven heights, uneven angles of slopes, and uneven shapes of the peaks, (ii) deterioration of field emission efficiency and increase in power consumption due to non-sharp peaks.

Further, this eliminates necessity of system for highly accurately moving and rotating an apparatus for the spin deposition, thereby attaining a significant cost reduction.

Furthermore, intensity distribution that matches with the shape of the emitters 53 is formed by using the micro lens array 50 (not shown) provided between the light source 1 and the glass substrate 47 on which the negative resist 49 functioning as an insulating film, and the conductive layer 48 that is to be the cathode electrode film 48a are formed. The negative resist 49 is exposed to the light directed thereto from above the glass substrate 47 (that is, via the glass substrate 47), thereby forming pre-emitter shapes of the emitters 53. Thereafter, the pre-emitter shapes of the emitters 53 are transferred to the conductive layer 48 by etching. This arrangement forms the sharp shape of the emitters 53 highly accurately aligned in matrix in accordance with the positions of the micro lenses of the micro lens array 50.

With this arrangement, therefore, it is possible to enable the field emission display to operate without damaging the emitters 53 that emit the electrons, and with improved brightness by inhibiting occurrence of uneven brightness.

Moreover, with the arrangement in which the conductive layer 48 including the cathode electrode 48a and the emitter formation layer made of the same material is provided, it is possible to concurrently form the cathode electrode film 48a and the emitters 52 in etching, thereby improving the overall throughput of the manufacturing process.

Fourth Embodiment

Described below is yet another embodiment of the present invention, referring to FIGS. 6 and 7. Note that members having the same functions as the members illustrated in the first to third embodiments are labeled in the same fashion and their explanation is omitted here for the sake of easy explanation.

Figure 6:
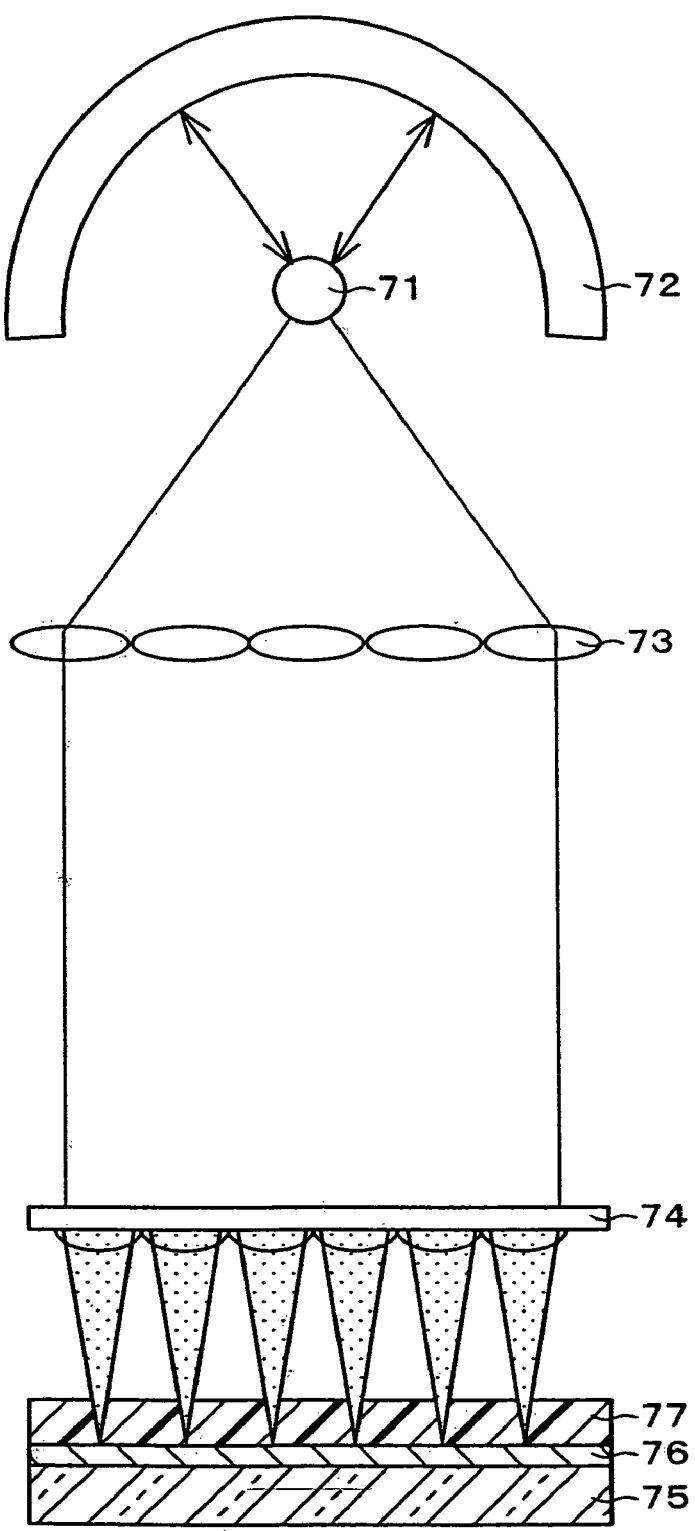
FIG. 6 is a structural view of an exposure apparatus as a manufacturing apparatus for use in making circularly cone pre-emitter shapes to be emitters in the manufacturing method of the field emission display.
Figure 7:
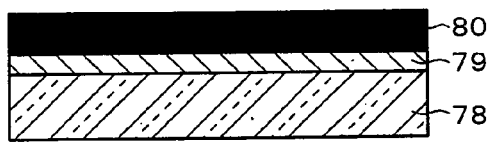
FIGS. 7(A) to 7(J) are cross-sectional views illustrating yet another embodiment of the manufacturing method of the present invention for manufacturing the field emission display, the views showing steps of the manufacturing method.
Figure 7:
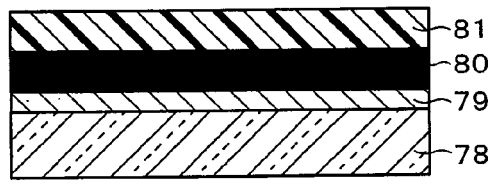
Figure 7:
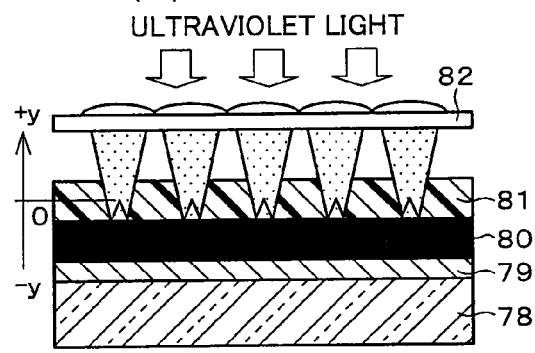
Figure 7:
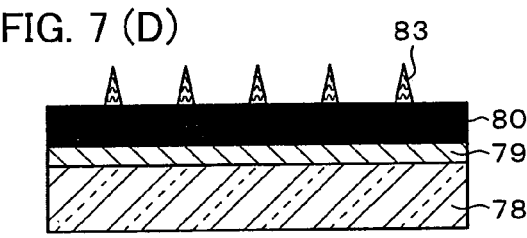
Figure 7:
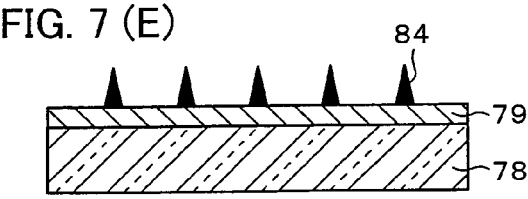
Figure 7:
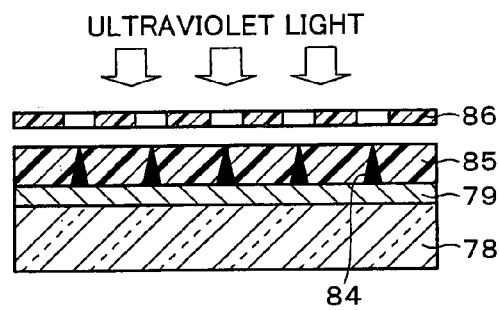
Figure 7:
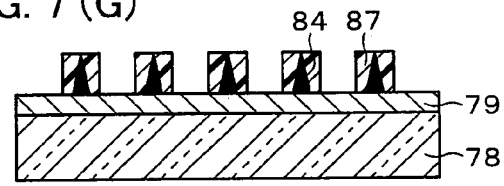
Figure 7:
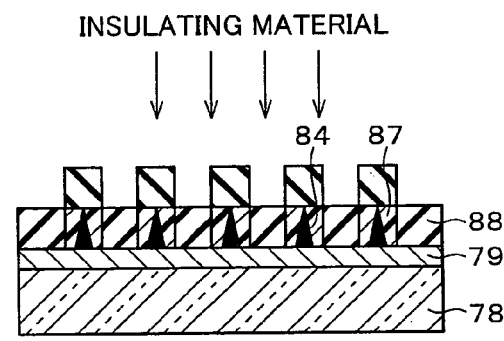
Figure 7:
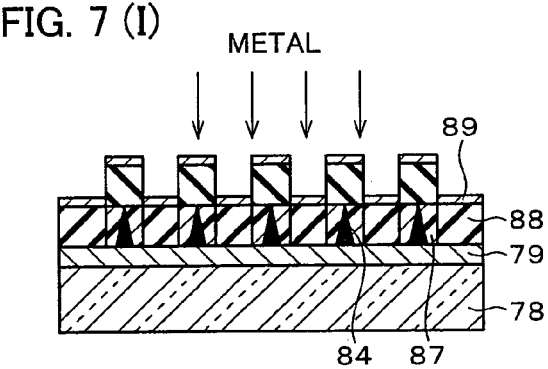
Figure 7:
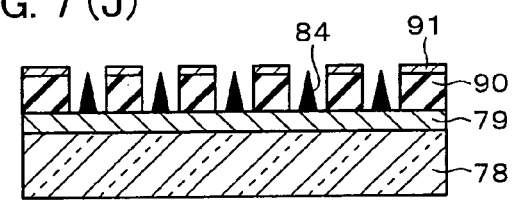

In the present invention, as shown in FIG. 6, an exposure optical system for producing a shape of emitters of the field emission display is different from the one illustrated in FIG. 2 of the first embodiment.

Specifically, in a manufacturing method of the present embodiment for manufacturing a field emission display, as shown in FIG. 6, a micro lens array 74 is provided between a light source 71 and a glass substrate that is to be a base plate. A photo sensitive material 77 is exposed to light directed to photo sensitive material 77 from above the photo sensitive material 77. This arrangement, as shown in FIGS. 7(A) to 7(J), allows to use various materials, irrelevantly of their light transmittance, for the glass substrate 78. Similarly, this arrangement allow to use various conductive materials for a conductive film 79 and an emitter formation layer 80 provided on the glass substrate 78, the conductive film 79 functioning as a cathode electrode film.

With reference to FIG. 6, described below is the exposure optical system for making a shape of later described emitters 84 of the field emission display. Note that a difference between the present embodiment and the arrangement shown in FIG. 1 is in that, as described above, the photosensitive material 77 is exposed to the light directed thereto via the micro lens array 74 from above the photosensitive material 77. The micro lens array 74 is provided between the light source 71 and the glass substrate 75 that is to be the base plate. Moreover, the emitters 84 of the present embodiment have a circularly cone shape having a sharp peak, as in the first and second embodiments.

More specifically, as shown in FIG. 6, the light source 71 is a light source for ultraviolet light including the wave length of 365 nm. Light beams emitted from the light source 71 are converted into parallel light beams having even light intensity distribution, by a condensing mirror 72 and fly eye lenses 73. The parallel light beams are directed into the micro lens array 74.

In a vicinity of focus points of the micro lens array 74, the glass substrate 75 is provided. On the glass substrate 75, provided is a cathode electrode formation layer 76 in which a cathode electrode section of the field emission display is to be formed. The glass substrate 75 is so provided that the cathode electrode formation layer 76 faces toward the light source 1. The cathode electrode formation layer 76 is coated with a photosensitive material 77 that is sensitive to light of the wavelength of 365 nm.

The photosensitive material 77 is exposed to the light directed thereto after condensed via the micro lens array 74, thereby forming a shape of the emitters 84.

Referring to FIGS. 7(A) to 7(J), described below is a manufacturing method of the present invention for manufacturing the field emission display by using the exposure apparatus.

To begin with, as shown in FIG. 7(A), the conductive film 79 as the cathode electrode film, and the emitter formation layer 80 are formed on the glass substrate 78 as the base plate. In the present embodiment, a chromium film of 0.2 μm thickness is formed as the conductive film 79 by the sputtering method. On the chromium film, a molybdenum (Mo) film of 1 µm thickness as the emitter formation layer is formed.

Next, as shown in FIG. 7(B), a negative resist 81 as the photosensitive material is applied on the emitter formation layer 80. In the present embodiment, the negative resist 81 having 0.5 µm thickness is applied by the spin coating method.

Next, as shown in FIG. 7(C), the negative resist 81 is exposed to the light directed thereto via the micro lens array 82 from above the negative resist 81 on the glass substrate 78.

Figure 3:
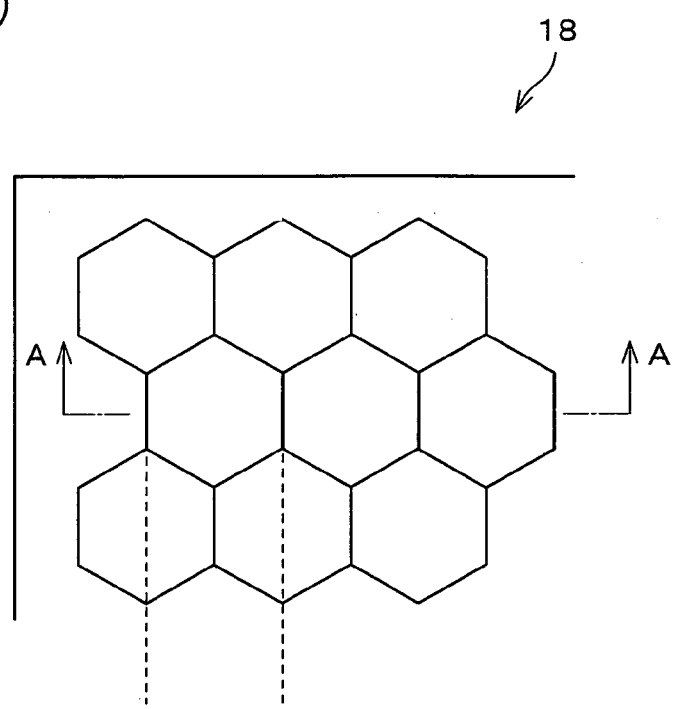
FIG. 3(A) is a plan view showing an micro lens array of the exposure apparatus.
FIG. 3(B) is a cross-sectional view taken on line A—A of FIG. 3(A).
Figure 3:
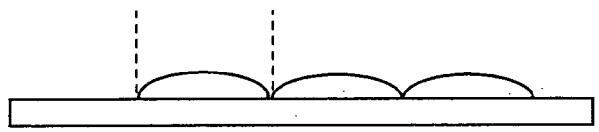

Here, the micro lens array 82 used in the present embodiment is similarly arranged to the one shown in FIG. 3 of the first embodiment, except that micro lenses of the micro lens array 82 are so arranged that an inscribed circle of each micro lens has a diameter of 3.0 µm, a focal distance of each micro lens is 8.2 µm, and the micro lenses are positioned with a pitch of 3.0 µm An alignment mark (not shown) is formed on a substrate part of the micro lens array 82. The alignment mark is for positional matching of the micro lens array 82 with the glass substrate 78 or a mask 86 later described.

Next, the exposure is explained, referring to FIG. 7(C)

As in FIG. 4(C) of the second embodiment, light intensity is so distributed near focal points of the micro lenses that the light intensity is strongest and beam diameters are smallest at the focal points (y=0), and points farer from the focal points have weaker light intensity, thereby obtaining a gaussian shape. Moreover, the intensity distribution at the focal points is so distributed in an elliptical shape along ±y direction, so that the point farer from the focal point has weaker intensity, where the y direction is an emission direction from the micro lens. In the present embodiment, the circular cone shape is formed by using the intensity distribution along the emission direction (+y direction).

In the present embodiment, the focal points (y=0) are set in interior of the negative resist 81. In case the focal points (y=0) are set in the interior of the negative resist 81, the light passed through the micro lens array 82 is not condensed on a top surface of the negative resist 81 but its light intensity distribution is scattered on the top surface of the negative resist 81. Therefore, hardening of the negative resist 81 is not initiated in a short time.

On the other hand, the light is condensed at the focal points so as to give large light intensity thereat. Thus, the hardening of the negative resist 81 is initiated in a shorter time at the focal points than at the top surface thereof. In other words, the hardening of the negative resist 81 is initiated from its inside. In case the negative resist 81 has a large absorption coefficient, a micro lens array 82 having a shorter focal distance is used, compared with a case where the absorption coefficient of the negative resist 82 is small, thereby obtaining a spot diameter on the top surface of the negative resist 81 so as to have a scattered light intensity distribution thereon. In this way, the hardening on the top surface can be slowed down, while accelerating the hardening inside.

Here, in order to form, inside the negative resist 81, a circular cone shape whose peaks points to the top surface of the negative resist 81, reflective light reflected from the emitter formation layer 80 made of molybdenum (Mo) film has its focal point in a vicinity of a half thickness of the negative resist layer 81. This arrangement attains an intensity distribution wide in the −y direction, thereby attaining the circular cone shape whose peak point to the top surface of the negative resist 81.

With this arrangement, the negative resist 81 is exposed to the light that passes through the micro lenses and is reflected from the emitter formation layer 80 so that the focal points of the micro lenses are positioned in the vicinity of the mid thickness of the negative resist 81. Hereby, a circular cone shape whose peak points to the top surface of the negative resist 81 is formed.

Next, as shown in FIG. 7(D), development is carried out so as to form sharp circular cone pre-emitter shapes 83 on the emitter formation layer 80. Here, the circular cone pre-emitter shapes 83 thus formed are 1.0 µm in diameter and 2.3 µm in height Next, as shown in FIG. 7(E), the circular cone pre-emitter shapes 83 made of the negative resist 81 are transferred, by dry etching, to the molybdenum (Mo) film as the emitter formation layer 80, thereby forming sharp circular cone-shaped emitters 84 highly accurately aligned orderly in matrix. In making a tip part of the circular cone shape, it is possible to attain a circular cone shape that is sharper than the circular cone pre-emitter shapes 83 made of the negative resist 81, by arranging such that a selection ratio of the emitter formation layer 80 with respect to the negative resist 81 is more than one. Moreover, the etching is stopped when the conductive film 79 is bared. In the present embodiment, the emitters 84 thus formed has a circular cone shape of 1.0 µm diameter and of 2.6 µm height.

Next, as shown in FIG. 7(F) to 7(J), an insulating layer 90 and a gate electrode film 91 are formed around the emitters 84 having the circular cone shape, by using the lift-off method and the sputtering method. In the present embodiment, a $SiO_2$ layer 88 is formed as the insulating layer 90 and a chromium film 89 as the gate electrode film 91

More specifically, as shown in FIG. 7(F), a negative resist 85 is applied on the conductive film 79 and the emitters 84 by the spin coating method. Then, the negative resist 85 is exposed by using a mask 86 having the circular openings having a 2.0 µm diameter and positioned in accordance with the micro lenses of the micro lens array 82. Here, positional matching between the mask 86 and the micro lens array 82 can be carried out by using alignment marks (not shown) marked in advance and checking, by using the exposure apparatus in exposing, whether or not they are matched.

Thereafter, as shown in FIG. 7(G), development is carried out so that a negative resist layer 87 is formed on the emitters 84, whereas that part of the conductive film 79 which is not associated with the emitters 84 is left uncovered.

Next, as shown in FIG. 7(H), the $SiO_2$ film 88 is formed thereon all over by the sputtering method. Further, as shown in FIG. 7(I), the chromium film 89 is formed by the sputtering method thereon.

After that, the negative resist layer 87, the $SiO_2$ film 88, and the chromium film 89 thus formed on the emitters 84 are peeled off. This peeling is carried out by soaking the layers into a sodium hydroxide aqueous solution of 10% concentration for an appropriate length of time.

As a result, as shown in FIG. 7(I), (a) the insulating layer 90 made of the $SiO_2$ film 88 and (b) the gate electrode film 91 made of the chromium film 96 are formed around the emitters 84. In the present embodiment, the insulating layer 90 thus formed has a thickness of 1.0 µm, and the gate electrode film 91 thus formed has a thickness of 0.2 µm.

The emitter formation layer 80 may be made of an insulating material, whereas the emitter formation layer 80 is made of molybdenum (Mo) in the present embodiment. In this case, as described in the first embodiment, a conductive material is applied onto an insulating layer formed by the step of lifting off, thereby concurrently forming (a) the emitters and (b) the gate electrode film on the insulating layer.

As described above, according to the present embodiment, the pre-emitter shapes of the emitters 84 are transferred to the emitter formation layer 80 by etching. This enables to omit the step of the spin deposition or the like, thereby improving overall throughput of the manufacturing process. Moreover, it is possible to solve problems caused by the conditions and the like in the spin deposition method. Such problems are, namely, (i) deterioration of evenness in field emission due to uneven heights, uneven angles of slopes, and uneven shapes of the peaks, (ii) deterioration of field emission efficiency and increase in power consumption due to non-sharp peaks.

Further, this eliminates necessity of system for highly accurately moving and rotating an apparatus for the spin deposition, thereby attaining a significant cost reduction.

Moreover, the exposure is so carried out that the light directed to the negative resist 81 is emitted from the light source 71 provided to face a negative resist 81. This arrangement allows to use, irrelevantly of light transmissivity, various materials for the conductive material of which the conductive film 79 as the cathode electrode film and the emitter formation layer 80 are made.

Therefore, it is possible to form those layers with a material having an excellent conductivity. Thus, it is possible to produce a field emission display having a high field emission efficiency. Moreover, this arrangement allows the micro lens array 82 to be provided in a position close to the negative resist 81, thereby attaining a wide design of the focal distance. Such a wide design gives a large freedom in designing the micro lens array 82.

Moreover, intensity distribution that matches with the shape of the emitters 84 is formed by using the micro lens array 82 provided between the light source 71 and the glass substrate 78 on which the emitter formation layer 80 and the conductive film 79 that is to be the cathode electrode film. The negative resist 81 is exposed to the light directed thereto from the light source 71 provided to face the negative resist 81, thereby forming the pre-emitter shapes of the emitters 84.

Thereafter, the pre-emitter shapes of the emitters 84 are transferred to the emitter formation layer 80 by etching. This arrangement forms the sharp emitters 84 highly accurately aligned orderly in matrix in accordance with the positions of the micro lenses of the micro lens array 82.

With this arrangement, therefore, it is possible to enable the field emission display to operate without damaging the emitters 84 that emit the electrons, and with improved brightness by inhibiting occurrence of uneven brightness.

Moreover, in making the tip part of the circular cone pre-emitter shapes, it is possible to attain a sharper circular cone shape, by arranging such that a selection ratio of the emitter formation layer 80 with respect to the negative resist 81 is more than one. This attains low power consumption in operating the display.

Fifth Embodiment

Described below is still yet another embodiment of the present invention, referring to FIG. 10. Note that members having the same functions as the members illustrated in the first to fourth embodiments are labeled in the same fashion and their explanation is omitted here for the sake of easy explanation. Moreover, in the present invention, an exposure optical system for producing a shape of emitters of the field emission display is arranged similarly with the one illustrated in FIG. 6 of the fourth embodiment.

As shown in FIGS. 10(A) to 10(K), a manufacturing method of the present embodiment for manufacturing the field emission display is so arranged that a negative resist 145 is used as a photosensitive material, and the negative resist 145 is exposed to light condensed by using a micro lens array 146, so as to form pre-emitter shapes of emitters 148. The pre-emitter shapes of the emitters 148 are transferred to an emitter formation layer and a catalyst layer by etching. The emitter formation layer is made of a conductive material, and the catalyst layer is for producing carbon nanotubes and is provided on the emitter formation layer. Finally, carbon nanotubes are formed selectively only on peak sections of the pre-emitter shapes of the emitters formed from the catalyst layer.

Moreover, the emitters of the present embodiment, as in the first to fourth embodiment, has a circular cone shape whose peak is sharp.

By forming the carbon nanotubes on the peak sections of the emitters, the emitters can have a sharper peak compared with metal emitters. Thus, it is possible to improve the field emission efficiency and attain a lower power consumption. Moreover, excellent chemical safety of the carbon nanotubes provides the emitters with a better performance and a longer life.

Moreover, because it is possible to selectively form the carbon nanotubes only in peak sections of the emitters directly, it is possible to omit a step of fixing separately prepared carbon nanotubes on the peak sections by an adhesive agent or the like. This attains a better production efficiency and a lower cost.

A manufacturing method of the present embodiment for manufacturing the field emission display is descried below, referring to FIGS. 10(A) to 10(K).

Figure 10A:
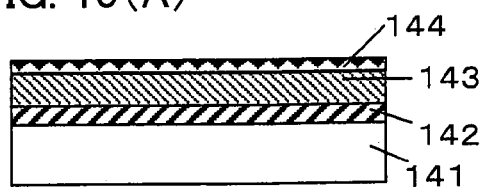

To begin with, as shown in FIG. 10(A), on a glass substrate 141 functioning as a base plate, (a) a conductive film 142 that is to be a cathode electrode film, and (b) an emitter formation layer 143, (c) and a catalyst layer 144 for producing the carbon nanotubes are formed in this order. In the present embodiment, a chromium film of 0.21 μm thickness is formed as the conductive film 142 by the sputtering method. On the chromium film, a molybdenum (Mo) film of 1.0 μm is formed as the emitter formation layer 143 by the sputtering method. Further, as the catalyst layer 144 for producing the carbon nanotubes, a metal thin film containing Fe and Ni is formed by the sputtering method. The metal thin layer has a thickness of 10 nm to 20 nm.

Figure 10B:
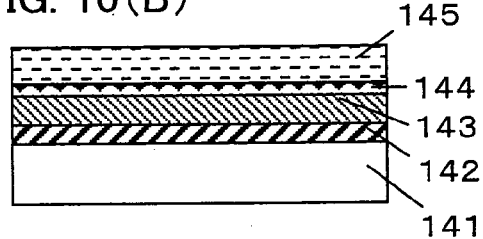
Figure 10B:
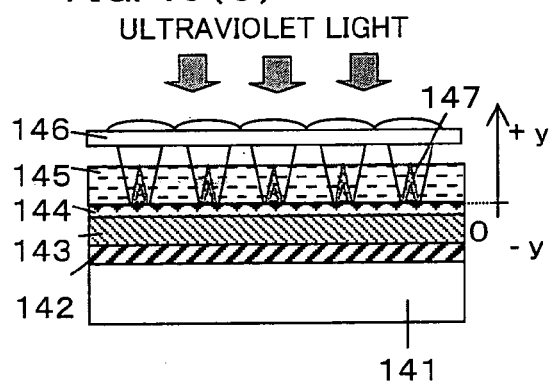

Next, as shown in FIG. 10(B), a negative resist 145 is applied as a photosensitive material on the catalyst layer 144. In the present embodiment, the negative resist 145 is applied to a thickness of 0.4 μm by the spin coating method.

Next, as shown in FIG. 10(C), the negative resist 145 applied on the catalyst layer 144 is exposed to light directed thereto via the micro lens array 146 from above the negative resist 145 on an opposite side of the glass substrate 141.

Here, the micro lens array 146 used in the present embodiment has a similar structure to the one shown in FIG. 3 of the first embodiment, except that the micro lens array 146 is has such a size that an inscribed circle of each micro lens has a diameter of 3.0 μm, a focal distance of each micro lens is 8.2 μm, and the micro lenses are positioned with a pitch of 3.0 μm.

In the present embodiment, the negative resist 145 is exposed to the light directed thereto via the micro lens array 146 from above the negative resist 145.

An alignment mark (not shown) is marked on a substrate part of the micro lens array 146. The alignment mark is for positional matching of the micro lens array 146 with the glass substrate 141 or a mask later described.

As in FIG. 7(C) of the fourth embodiment, the negative resist 145 is exposed to the light that passes through the micro lenses and is reflected from the catalyst layer 144 underneath the negative resist 145 in such a manner that the focal points of the micro lenses are positioned in the vicinity of the mid thickness of the negative resist 145. With this arrangement, the light passes through the micro lens array 146 is not condensed on a top surface of the negative resist 145 and its light intensity distribution is scattered on the top surface of the negative resist 145. Because of this, hardening of the negative resist 145 is not initiated in a short time on the top surface of the negative resist 145. On the other hand, the light is condensed at the focal points so as to give large light intensity thereat. Thus, the hardening of the negative resist 145 is initiated in a shorter time at the focal points, compared with the top surface. Therefore, the hardening of the negative resist 145 is initiated from its inside. In this way, sharpest possible circular cones whose peaks pints to the top surface of the negative resist 145.

Figure 10D:
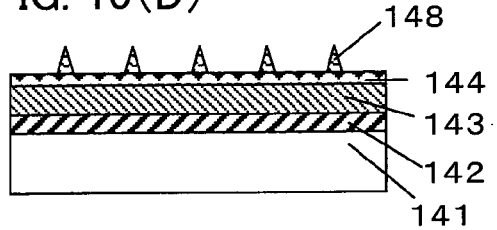

Next, as shown in FIG. 10(D), development is carried out so that sharp circular cone pre-emitter shapes 148 are formed on the catalyst layer 144. Here, the circular cone pre-emitter shapes 148 thus formed have a 2.3 µm height and a bottom surface of 1.0 µm.

Figure 10E:
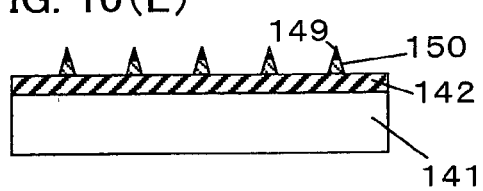
Figure 10E:
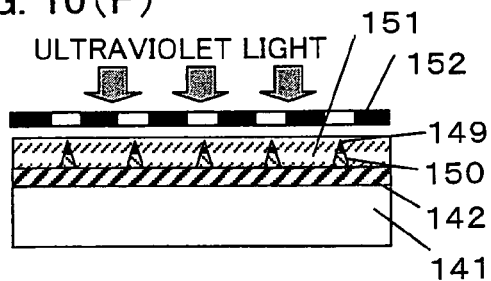

Next, as shown in FIG. 10(E), the circular cone pre-emitter shapes 148 made of the negative resist 145 are transferred, by dry etching, to the molybdenum (Mo) film as the emitter formation layer 143, and the metal thin film including Fe and Ni, which is the catalyst layer 144 for producing the carbon nanotubes. Hereby, sharp circular cone pre-emitter shapes of emitters highly accurately aligned orderly in matrix are formed. In making a tip part of the circular cone pre-emitter shapes, it is possible to attain a circular cone shape that is sharper than the circular cone pre-emitter shapes 148 made of the negative resist 145, by arranging such that a selection ratio of the emitter formation layer 143 and the catalyst layer with respect to the negative resist 145 is more than one.

Moreover, in transferring the pre-emitter shapes of the emitters, it is preferable that a catalyst layer section 149 of 10 nm or more height remains at each peak of the emitters. The etching is stopped when the conductive film 142 is bared. In the present embodiment, emitters 150 have a circular cone shape having a height of 2.6 µm and a bottom whose diameter is 1.0 µm.

Next, as shown in FIGS. 10(F) to 10(J), an insulating layer 156 and a gate electrode film 157 are formed around the circular cone shaped emitters 150 by using the lift-off method and the sputtering method in combination. In the present embodiment, a SiO₂ layer 153 is formed as the insulting layer 156, and a chromium film 155 is formed as the gate electrode film 157.

More specifically, as shown in FIG. 10(F), a negative resist 151 is applied on the conductive film 142 and the emitters 150 by the spin coating method. The negative resist 151 is exposed to light by using a mask 152 having circular openings having a 2 µm diameter and aligned in accordance with micro lenses of the micro lens array 146. Here, positional matching of the mask 152 and the micro lens array 146 can be carried out, in exposing, by using the exposure apparatus for detecting an alignment mark marked in advance.

Figure 10G:
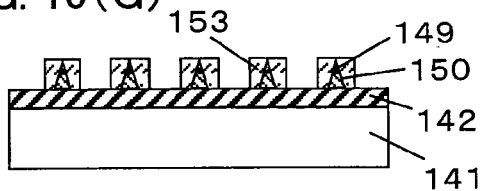

Thereafter, as shown in FIG. 10(G), development is carried out so that a negative resist layer 153 is formed on the emitters 150, whereas that part of the conductive film 142 which is not associated with the emitters 150 is left uncovered.

Figure 10H:
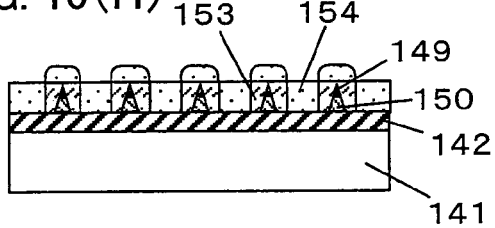
Figure 10H:
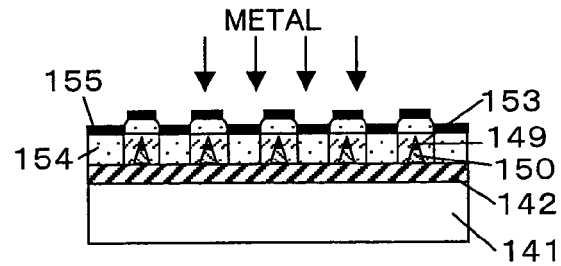

Next, as shown in FIG. 10(H), the SiO₂ film 154 is formed thereon all over by the sputtering method. Further, as shown in FIG. 10(I), the chromium film 155 is formed thereon by the sputtering method.

Thereafter, the negative resist layer 153 formed on the emitter 150 is peeled off by using a solvent, and, at the same time, the SiO₂ film 154 and the chromium film 155 on the negative resist layer 153 are peeled off. This peeling is carried out by soaking the layers in a sodium hydroxide aqueous solution of 10% concentration for an appropriate length of time.

Figure 10J:
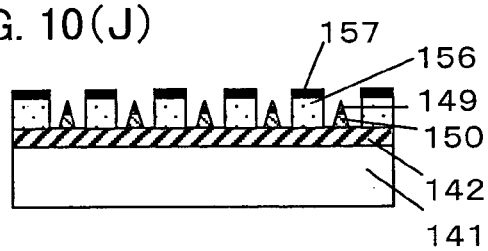

As a result, as shown in FIG. 10(J), around the emitters 150, the insulating layer 156 is formed from the SiO₂ film 154, and the gate electrode film 157 is formed from the chromium film 155. In the present embodiment, the insulating layer 156 thus formed has a 1.0 µm thickness and the gate electrode film 157 thus formed has a 0.2 µm thickness.

Figure 10K:
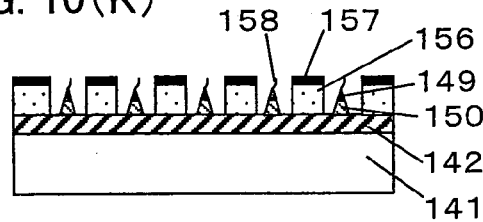
Figure 11:
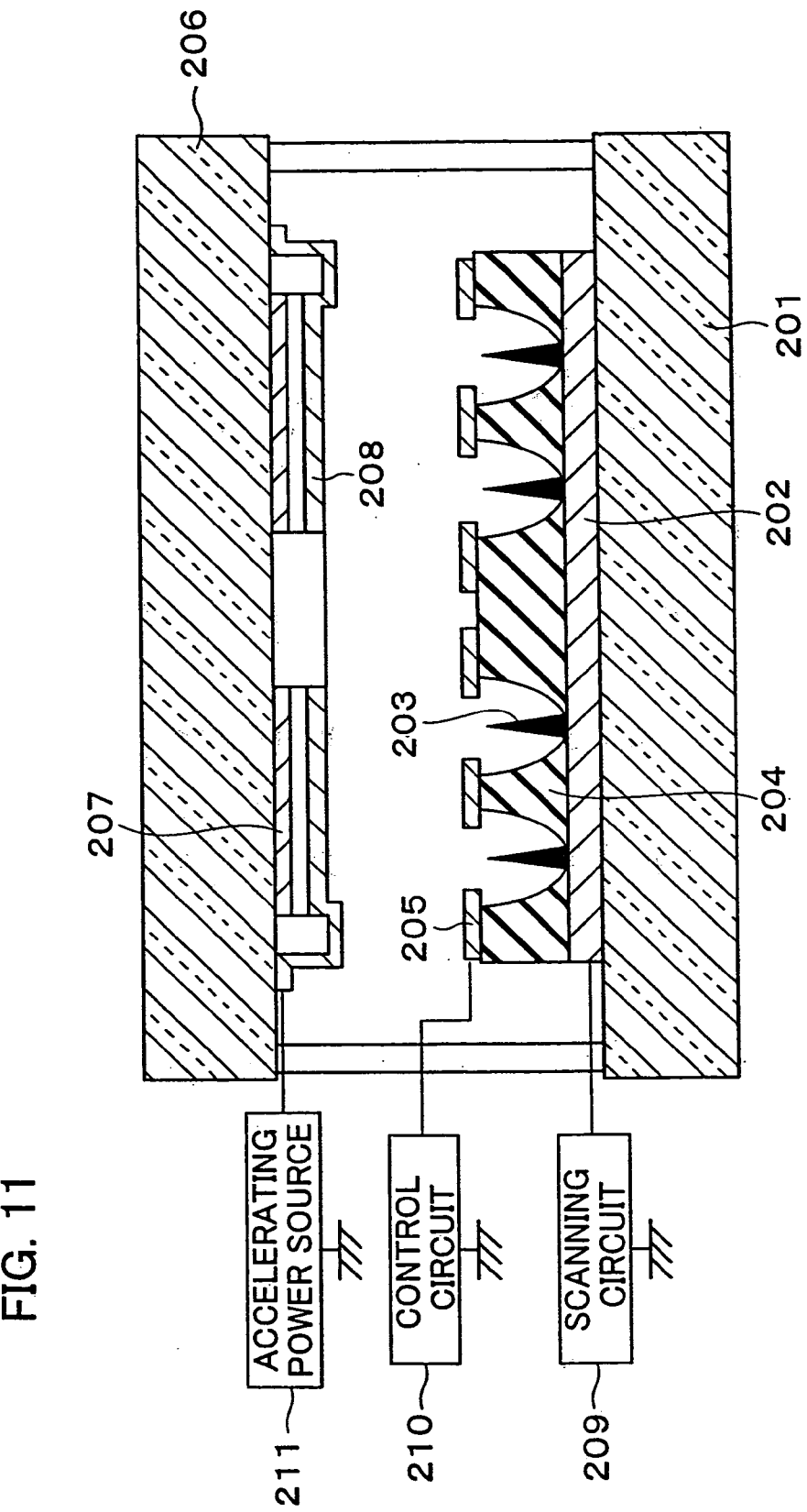
FIG. 11 is a cross-sectional view illustrating a structure of a conventional field emission display.
Figure 12:
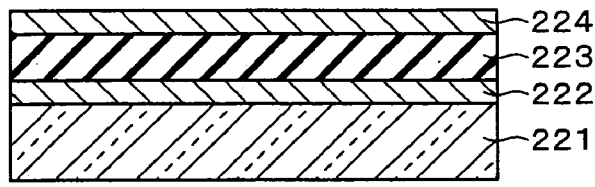
FIGS. 12(A) to 12(E) are cross-sectional views illustrating steps in a conventional manufacturing method of a field emission display.
Figure 12:
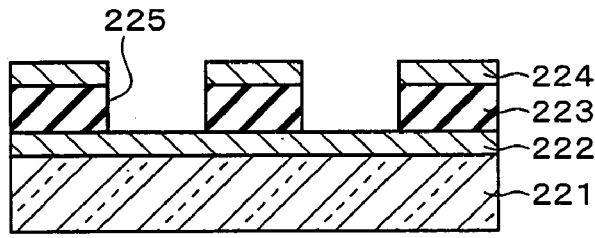
Figure 12:
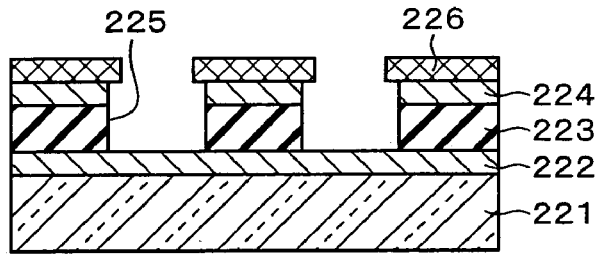
Figure 12:
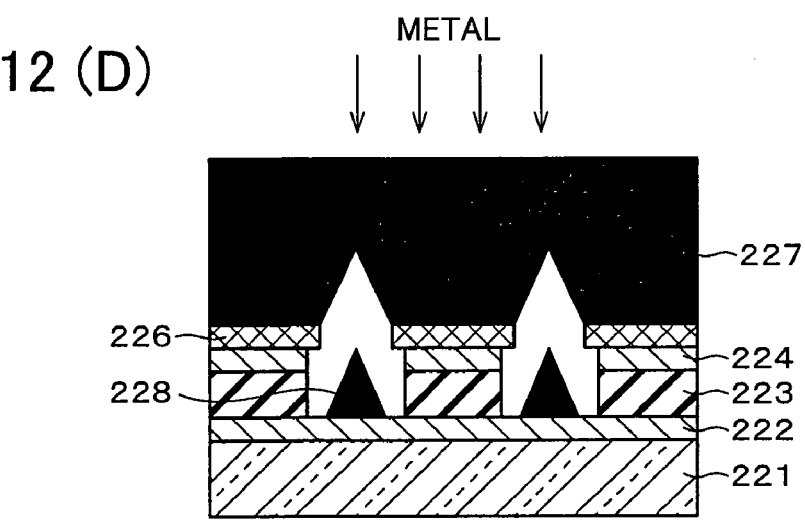
Figure 12:
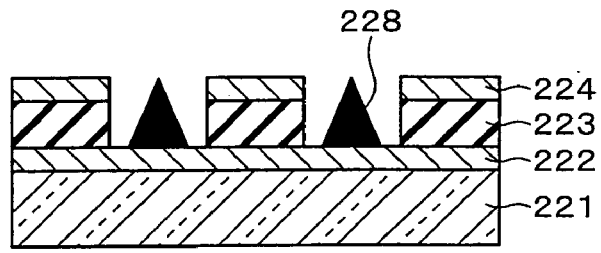

Next, as shown in FIG. 10(K), carbon nanotubes 158 formed on the catalyst layer 149 at peak sections of the emitters. More specifically, the carbon nanotubes 158 are formed by an electric field application type plasma CVD (Chemical Vapor Deposition) method. The carbon nanotubes thus formed have a needle-like shape having a diameter in a range of from 10 nm to 20 nm, and a height of from 200 nm to 400 nm. The carbon nanotubes are extended vertically from the catalyst layer sections 149 at the peak sections of the emitters.

As described above, according to the present embodiment, in which the shapes of the emitters are directly formed in the emitter formation layer, it is possible to omit the step of the spin coating method or the like, thereby improving the overall throughput of the manufacturing process. Further, the present embodiment eliminates necessity of (a) an expensive apparatus for the spin deposition, such as a high resolution exposure apparatus and the like, and (b) a system that performs highly accurate movement and rotation for the spin deposition, thereby preventing cost increase.

Further, it is arranged that the catalyst layer for producing the carbon nanotubes is formed on the emitter formation layer and the carbon nanotube is formed in the catalyst layer sections of the emitters. This arrangement gives the emitters a sharper peak, compared with the metal emitters, thus attaining improvement of the field emission efficiency and low power consumption in operating the field emission display. Moreover, the excellent chemical safety of the carbon nanotubes provides the emitter better performance and a long life.

Furthermore, because it is possible to form the carbon nanotubes directly on the catalyst layer, it is possible to omit the step of fixing the separately prepared carbon nanotubes on the peak sections by an adhesive agent or the like. This attains a better production efficiency and a lower cost.

Moreover, it is possible to selectively form the carbon nanotube only on the peak sections of the emitters, by the arrangement in which the peak sections of the emitters are formed from the catalyst layer. Therefore, it is possible to prevent the carbon nanotube from adhering to where the carbon nanotube suppose not to adhere. Thus, it is possible to attain even brightness distribution.

Sixth Embodiment

Figure 8:
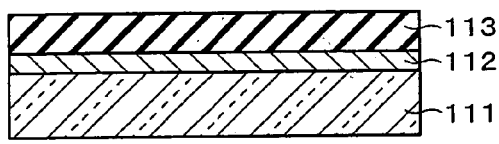
FIGS. 8(A) to 8(F) are cross-sectional views illustrating still yet another embodiment of the manufacturing method of the present invention for manufacturing the field emission display, the views showing steps of the manufacturing method.
Figure 8:
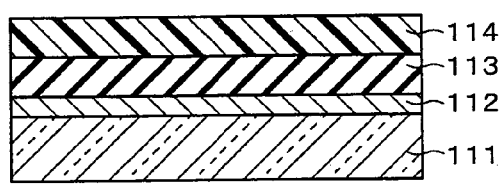
Figure 8:
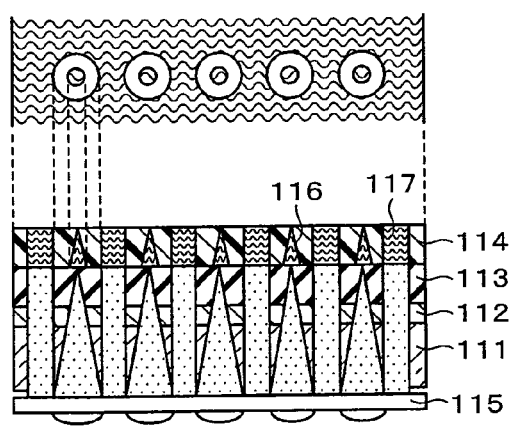
Figure 8:
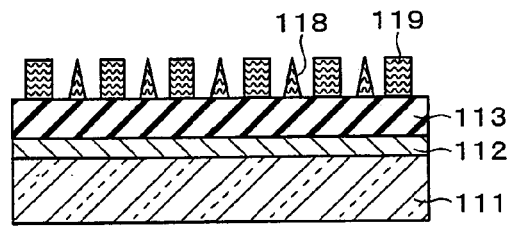
Figure 8:
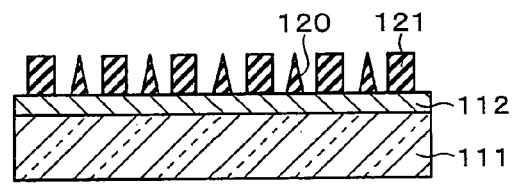
Figure 8:
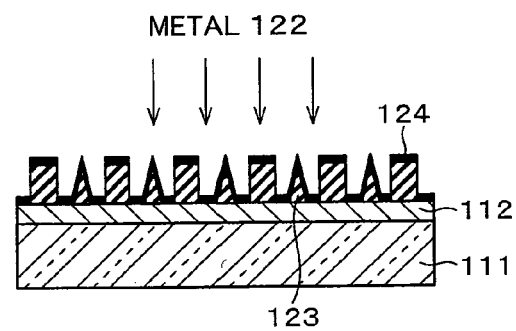

Yet still another embodiment is descried below, referring to FIGS. 8 to 9. Note that members having the same functions as the members illustrated in the first to fifth embodiments are labeled in the same fashion and their explanation is omitted here for the sake of easy explanation.

Figure 9:
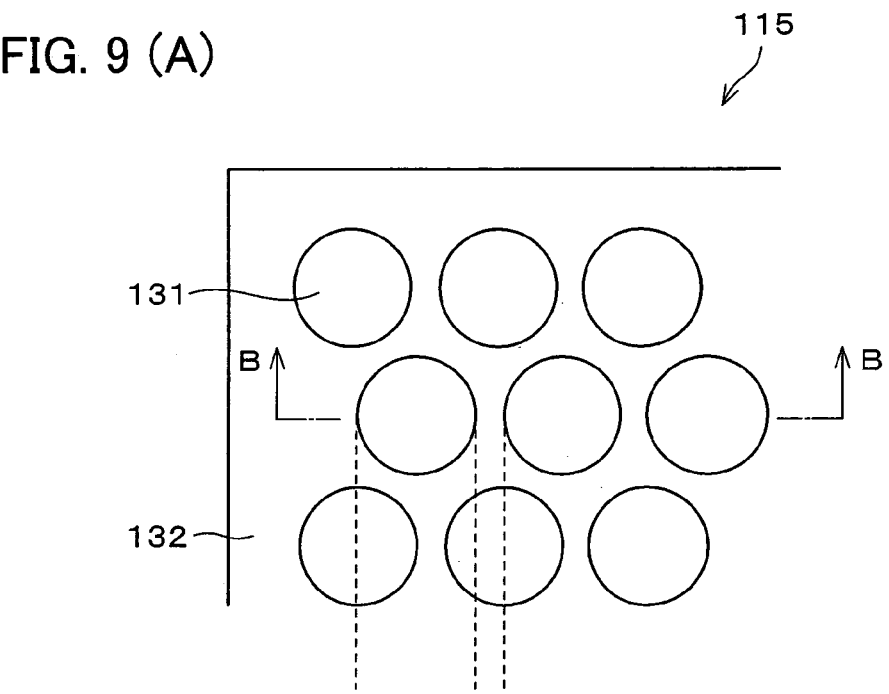
FIG. 9(A) is a plan view showing an micro lens array of an exposure apparatus for use in making a circular cone pre-emitter shapes to be emitters in the manufacturing method of the field emission display.
FIG. 9(B) is a cross-sectional view taken on line A—A of FIG. 9(A).
Figure 9:
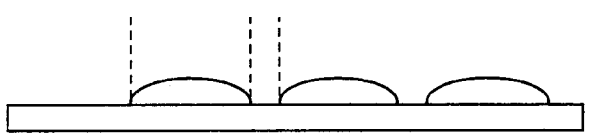

Moreover, in the present invention, an exposure optical system for producing a shape of emitters of the field emission display is arranged similarly with the one illustrated in FIG. 2 of the first embodiment, except that a micro lens array 115 having wide intervals between lenses as shown in FIG. 9 is used in a manufacturing method of the present embodiment for manufacturing the field emission display. With this arrangement, as shown in FIGS. 8(A) to 8(F), circular cone pre-emitter shapes 118 to be emitters and post-development pattern 119 are concurrently formed in an emitter formation layer 113 that is a transparent insulating layer. The post-development pattern 119 is an insulating film.

With this arrangement, the circular cone pre-emitter shapes 118 to be the emitters can be formed without the spin deposition method, and formation of openings can be performed by using the post-development pattern 119 that is an insulating film that needs no mask.

Moreover, after the formation of the circular cone pre-emitter shapes 118 and the post-development pattern 119, a conductive material is applied on the emitter formation layer 113 that is a transparent insulating layer. In this way, it is possible to concurrently form (a) the gate electrode film 124 on the insulating layer 121, and (b) the emitters 123.

Referring to FIGS. 8(A) to 8(F), a manufacturing method, which has the feature descried above, of the present embodiment for manufacturing the field emission display is described below, specifically.

To begin with, as shown in FIG. 8(A), a conductive film 112 and an emitter formation layer 113 are formed on a glass substrate 111 as a base plate. A cathode electrode film will be formed from the conductive film 112. Here, it is necessary that the conductive film 112 and the emitter formation layer 113 be made of a material that is highly transparent to ultraviolet light. Thus, in the present embodiment, an ITO film of 0.2 μm thickness is formed as the conductive film 112 by the sputtering method, then a $SiO_2$ film of 3.0 μm thickness is formed as the emitter formation layer 113 by the plasma CVD method.

In the present embodiment, the emitter formation layer 113 is made of an insulting material, because circular cone pre-emitter shapes to be emitters, and an insulating layer are concurrently formed on the emitter formation layer 113.

Next, as shown in FIG. 8(B), a negative resist 114 that functions as a photosensitive material is applied on the emitter formation layer 113. In the present embodiment, the negative resist 114 is applied to 1.5 μm thickness by the spin coating method. The negative resist 114 has a resolution of 1 μm or less, and is capable of forming fine patterns. Moreover, the negative resist 114 is made of a material generally used in the etching process. It is possible to change selection ratio of the negative resist 114 with respect to other materials, according to etching condition. Thus, it is possible to change height and sharpness of the shape of emitters, by arranging such that the selection ratio of the insulating film with respect to the negative resist 114 is more than 1.

Next, as shown in FIG. 8(C), the negative resist 114 is exposed to light directed thereto via a micro lens array 115 from above the glass substrate 111.

A structure of the micro lens array used in the present embodiment is described below, referring to FIGS. 9(A) and 9(B).

As shown in FIGS. 9(A) and 9(B), the micro lens array 115 has lens portions 131 and the flat portion 132. Positions of the pre-emitter shapes match with positions of the lens portions 131 of the micro lens array 115. Each micro lens is circular and has a diameter of 8.0 μm, a focal distance of 110 μm, a lens-to-lens pitch of 10.0 μm. The flat portion 132 is transparent to light. Thus, the negative resist 114 corresponding to the flat portion 132 is exposed to the light.

As described above, the use of the micro lens array 115 having intervals between each lens enables concurrent formation of the circular cone pre-emitter shapes 118 and a post-development pattern 119, in such a manner that the light from a light source 1 is condensed in interior of the negative resist 114 by the liens portions 131, so at to form the circular cone pre-emitter shapes 118, and the light from the light source 1 passes through the flat portion 132 so as to form the post-development pattern 119 that is a shape of the insulating layer.

Here, by setting such that focal points of the micro lens array 115 are in a vicinity of interface between the negative resist 114 and the emitter formation layer 113, the pre-emitter shapes 118 thus formed in the negative resist 114 have such a shape that its bottom area is smallest possible, and its peak pointing opposite to the glass substrate 111 is sharpest possible.

In this way, the exposure forms the circular cone shapes 116 in the negative resist 114 in accordance with the micro lenses of the micro lens array 115. Moreover, as shown in FIG. 8(C), the light passes through the portion (flat portion) without the micro lenses. A pre-development pattern 117 in the negative resist 114 is exposed to the light. The pre-development pattern 117 is so shaped that circular columns are removed from the negative resist 114.

Next, as shown in FIG. 8(D), development is carried out so as to form, on the emitter formation layer 113, the sharp circular cone pre-emitter shapes 118, and the post-development pattern 119 that has a shape from which the circular columns are removed. Here, the circular cone pre-emitter shapes 118 thus formed have a diameter of 5.0 μm and a height of 1.5 μm, and the post-development pattern 119 thus formed has a height of 1.5 μm.

Next, as shown in FIG. 8(E), the circular cone pre-emitter shapes 118 and the post-development pattern 119 are transferred to the emitter formation layer 113 by dry etching, thereby forming sharp circular cone pre-emitter shapes 120 being highly accurately aligned orderly in matrix.

On the other hand, the post-development pattern 119 having the shape from which the circular columns are removed is transferred to the emitter formation layer 113 so as to form the insulating layer 121. The emitting is stopped when the conductive film 112 is bared. In the present embodiment, the transfer is carried out with such an arrangement that a selection ratio of the emitter formation layer 113 with respect to the negative resist 114. The circular cone pre-emitter shapes 120 thus formed have a size of a 5.0 μm diameter and a 3.0 μm height. Meanwhile, the insulating layer 121 has a quadrangular shape of 3.0 μm height.

Next, as shown in FIG. 8(F), a conductive material 122 is applied on the circular cone pre-emitter shapes 120 formed from the emitter formation layer 113 that is an insulating film. Hereby, emitters 123 are formed. Here, molybdenum (Mo) is deposited vertically to the glass substrate 111, thereby concurrently forming the circular cone-shaped emitters 123 and the gate electrode film 124 that is on the insulating layer. By changing an amount of the metal to be deposited, it is possible to change contact area between the emitters 123 and the conductive film 112.

With this arrangement, the emitters 123 thus formed are highly accurately aligned orderly in matrix, and has a sharp shape.

As described above, according to the present embodiment, the user of the micro lens array 115 having intervals between each lens enables the concurrent formation of the circular cone pre-emitter shapes 118 and the post-development pattern 119 that is an insulating layer. The formation of the circular cone pre-emitter shapes 118 is carried out by using the lens portions 131 of the micro lens array 115, whereas the formation of the post-development pattern is carried out by using the flat portion 132 of the micro lens array 115.

Therefore, with the arrangement in which the pre-emitter shapes are transferred, by etching, to the emitter formation layer 113 that is an insulating layer, it is possible to omit the step of the spin coating method, the formation and removal of a sacrificial layer, and the like. Because of this, it is possible to improve the overall throughput of the manufacturing process.

Moreover, it is possible to solve problems caused by the conditions and the like in the spin deposition method. Such problems are, namely, (i) deterioration of evenness in field emission due to uneven heights, uneven angles of slopes, and uneven shapes of the peaks, (ii) deterioration of field emission efficiency and increase in power consumption due to non-sharp peaks. Further, it is not necessary to use an expensive mask and expensive apparatus such as an exposure apparatus having a high resolution, in order to form the openings. Furthermore, it is not necessary to have a system for highly accurate movement and rotation for the spin deposition method. Because of this, the cost can be significantly reduced.

Moreover, by designing the micro lens array 115 to have an appropriate pitch, it is possible to concurrently carry out (a) the formation of the pre-emitter shapes by using the lens portions 131 of the micro lens array 115 and (b) the formation of the post-development pattern 119 that is to be the insulating layer 121 by using the flat portion 132, in which no lens is provided. Therefore, it is possible to highly accurately carry out the formation with a high throughput, without aligning the pre-emitter shapes with the post-development pattern 119. Thus, it is possible to prevent malfunction and low throughput due to inaccurate alignment.

Furthermore, the intensity distribution that matches with the shape of the emitters is produced by using the micro lens array 115 provided between the light source 1 and the glass substrate 111 on which the emitter formation layer 113 and the conductive film 112 as the cathode electrode film are formed. The negative resist 114 on the emitter formation layer 113 is exposed to the light directed thereto via the glass substrate 111, thereby forming the pre-emitter shapes of the emitters. Thereafter, the pre-emitter shapes are transferred to the emitter formation layer 113 by etching. This arrangement forms the sharp pre-emitter shapes highly accurately aligned in matrix in accordance with the positions of the micro lenses of the micro lens array 115.

Therefore, the field emission display can be operated without damaging the emitters 123 for emitting the electrons, thereby generating uneven brightness, and improving brightness.

Moreover, by depositing a metal such as molybdenum (Mo) or the like vertically with respect to the glass substrate 111, it is possible to concurrently forming the emitters 123, and the gate electrode film 124 on the post-development pattern 119 that is to the insulating layer 121. Further, the emitters 123 are formed by depositing the metal on the circular cone pre-emitter shapes 120 formed from the insulating film. Thus, it is possible to carry out the formation in a significantly shorter time, compared with the arrangement in which the whole emitters are formed by depositing. Thereby, the overall throughput of the manufacturing process is improved.

As described above, the method of the present invention for manufacturing the field emission display, including the steps (1a) to (4a), is so arranged that the photosensitive material is a positive resist.

According to the invention, in which the photosensitive material is a positive resist, it is possible to form the openings for forming the sharp emitters capable of attaining a high resolution. Therefore, it is possible to operate the field emission display with improved field emission efficiency and lower power consumption.

Moreover, the method of the present invention for manufacturing the field emission display, the above arrangement, is so arranged that the micro lens array is located between the light source and the substrate that is transparent, so as to expose the photosensitive material to the light directed thereto from above the substrate.

In the invention, the micro lens array is located between the light source and the substrate that is transparent, so as to expose the photosensitive material to the light directed thereto from above the substrate. According to the invention, formed in the photosensitive material are openings that correspond to the intensity distribution of spots of the light condensed by the micro lens array, and that correspond to the shape of the emitters.

Therefore, the openings that correspond to the shape of the emitters are formed simply by the exposure of the photosensitive. Thus, it is possible to omit the step of the spin coating method or the like, thereby improving the overall throughput of the manufacturing process. Further, the present invention eliminates necessity of (a) an expensive apparatus for the spin deposition, such as a high resolution exposure apparatus and the like, and (b) a system that performs highly accurate movement and rotation for the spin deposition, thereby preventing cost increase.

Moreover, the method of the present invention for manufacturing the field emission display, including the steps (1b) to (5), is so arranged that the photosensitive material is a negative resist.

In the present invention, the photosensitive material is a negative resist. Thus, it is possible to form the sharp emitters capable of attaining high resolution, by the method in which the resist is hardened by exposure. Thus, it is possible to operate the field emission display with improved field emission efficiency and lower power consumption.

Furthermore, the method of the present invention having the above arrangement, is so arranged that the transferring of step (5) is carried out by dry etching; and selection ratio of the emitter formation layer with respect to the photosensitive material in the etching is more than 1.

In the present invention, the pre-emitter shapes are transferred to the emitter formation layer by dry etching. As a result, it is possible to transfer the pre-emitter shapes with high anisotropy and good accuracy. Thus, it is possible to form the emitters having a sharp circular cone shape. Moreover, it is possible to attain sharper emitters with the arrangement in which selection ratio of the emitter formation layer with respect to the photosensitive material in the etching is more than 1. Thus, it is possible to enable the field emission display to operate without damaging the emitters 45 that emit the electrons, and with improved brightness by inhibiting occurrence of uneven brightness.

Moreover, the method of the present invention having the above arrangement is so arranged that the micro lens array is located between the light source and the substrate that is transparent, so as to expose the photosensitive material to the light directed thereto from above the substrate.

In the present invention, the micro lens array is located between the light source and the substrate that is transparent, so as to expose the photosensitive material to the light directed thereto from above the substrate. According to the present invention, it is possible to form the sharp circular cone pre-emitter shapes in the photosensitive material in accordance with the intensity distribution of the spot of the light condensed by the micro lens array. Therefore, it is possible to operate the field emission display with improved field emission efficiency and lower power consumption.

Moreover, the method of the present invention having the above arrangement, is so arranged that the conductive film is a transparent conductive film, and the emitter formation layer is a transparent insulating film, the method further comprising, after the transferring of step (5): (6) forming the emitters by depositing a conductive material onto the pre-emitter shapes formed from the transparent insulating film.

In the present invention, the conductive film is a transparent conductive film and the emitter formation layer is a transparent insulating film. Moreover, the emitters are formed by applying the conductive material onto the transparent insulating film, after the pre-emitter shapes of the emitters are transferred to the transparent insulating film.

As a result, it is possible to omit the step of the spin coating method or the like. Moreover, it is possible to significantly shorten the production time, compared with the arrangement in which the whole emitters are deposited.

Therefore, it is possible to improve the overall throughput of the manufacturing step. Moreover, the expensive apparatus such as high resolution exposure apparatus and the like, and the system for highly accurate movement and rotation, are not necessary in this arrangement, even though such apparatus and system are conventionally necessary for forming the emitters. Thus, it is possible to prevent an increase in cost.

Moreover, the method of the present invention having the above arrangement, is so arranged that both of the conductive film and the emitter formation layer are transparent conductive films; and the emitters are formed by, in step (5), transferring the pre-emitter shapes to the emitter formation layer formed from the transparent conductive film.

In this invention, both of the conductive film and the emitter formation layer are transparent conductive films. Further, in this invention, the emitters are formed by transferring the pre-emitter shapes to the emitter formation layer formed from the transparent conductive film.

As a result, it is possible to omit the step of the spin deposition method or the like. Moreover, the step of deposition is not necessary in forming the emitters.

Therefore, it is possible to improve the overall throughput of the manufacturing process. Moreover, the expensive apparatus such as high resolution exposure apparatus and the like, and the system for highly accurate movement and rotation, are not necessary in this arrangement, even though such apparatus and system are conventionally necessary for forming the emitters. Thus, it is possible to prevent an increase in cost.

Moreover, the method of the present invention having the above arrangement is so arranged that the micro lens array is located between the light source and the photosensitive material applied on the substrate, so as to expose the photosensitive material to the light directed thereto from above the photosensitive material.

In this invention, the conductive film, the emitter formation film and the photosensitive film are formed in this order on the substrate, and the photosensitive material is exposed to the light directed thereto from above the photosensitive material. According to this invention, it is possible to use, irrelevantly of their light transmissivity, various materials for the conductive material and the insulating material for forming the conductive film and the emitter formation layer, respectively.

Therefore, it is possible to use a material that is excellent in conductivity, or in insulating property. Thus, it is possible to manufacture a field emission display having excellent field emission efficiency.

Moreover, the method of the present invention having the above arrangement is so arranged that the emitter formation layer is a conductive film; and in step (5), the pre-emitter shapes are transferred to the conductive film so as to form the emitters. In this invention, the emitter formation layer is a conductive film and the pre-emitter shapes are transferred to the conductive film so as to form the emitters. According to this invention, therefore, it is possible to omit the step of the spin deposition or the like. Moreover, the emitter can be formed without doing deposition.

Therefore, it is possible to improve the overall throughput of the manufacturing process. Moreover, the expensive apparatus such as high resolution exposure apparatus and the like, and the system for highly accurate movement and rotation, are not necessary in this arrangement, even though such apparatus and system are conventionally necessary for forming the emitters. Thus, it is possible to prevent an increase in cost.

Moreover, the method of the present invention having the above arrangement is so arranged that the micro lens array has intervals between each of lens portions; the lens portions condense, in the interior of the photosensitive material, the light emitted from the light source, so as to form the pre-emitter shapes; and the intervals is a flat portion for letting the light pass therethrough so as to form shapes of the insulating layer.

In this invention, the micro lens array has intervals between each of lens portions. Moreover, the lens portions condense, in the interior of the photosensitive material, the light emitted from the light source, so as to form the pre-emitter shapes, whereas the intervals is a flat portion for letting the light pass therethrough so as to form shapes of the insulating layer.

As a result, it is possible to concurrently form the emitters and the insulating layer. Thus, the formation of the opening by using a mask is not necessary. Moreover, it is possible to omit the step of the spin deposition for the formation of the emitters. Further, it is not necessary to align the emitters and the insulating layer.

Thus, it is possible to manufacture high accurate emitters with high throughput.

Moreover, the method of the present invention having the above arrangement is so arranged that the conductive film is a transparent conductive film and the emitter formation layer is a transparent insulating film; and after the step (5), a conductive material is deposited from above the transparent insulating film, so as to form the emitters and a gate electrode film In this invention, the conductive film is a transparent conductive film, and the emitter formation layer is a transparent insulating film. Moreover, a conductive material is deposited from above the transparent insulating film, after the pre-emitter shapes and the shape of the insulating film are transferred to the emitter formation layer. In this way, the emitters and the cathode electrode film are formed.

As a result, the emitters and the cathode electrode film are concurrently formed. Further, it is possible to shorten the production time, compared with the arrangement in which the whose emitter are deposited. Thus, it is possible to improve the overall throughput of the manufacturing process.

Moreover, the method of the present invention for manufacturing the field emission display, including the steps (7) to (12), is so arranged that the emitter formation layer is a conductive film, and the catalyst layer is a metal thin layer; and in the step (11), the pre-emitter shapes are transferred to the conductive film and the metal thin film, so that peak portions of the emitters are formed from the catalyst layer.

According to this invention, it is possible to selectively form the carbon nanotubes only on the peak sections of the emitters, because the peak sections of the emitters are formed from the catalyst layer. Therefore, it is possible to prevent the carbon nanotube from adhering to where the carbon nanotube suppose not to adhere. Thus, it is possible to attain even brightness distribution.

Furthermore, in order to attain the object, an apparatus of the present invention for manufacturing a field emission display, the apparatus being for use in the methods of manufacturing the field emission display, is so arranged as to include: the light source for emitting the light of wavelengths including a wavelength to which the photosensitive material is sensitive; a lens for paralleling the light emitted from the light source; and the micro lens array for condensing the light thus paralleled by the light source so as to form a plurality of the pre-emitter shapes from the photosensitive material applied on the substrate that is to be the base plate.

In the present invention, the light emitted from the light source is paralleled so that the rays of the light have the even light intensity distribution. Thus, it is possible to use a substrate having a large area. Moreover, the use of the micro lens array enables to form the plurality of emitters at once. This improves efficiency of the production of the field emission display.

Therefore, it is possible to provide such a manufacturing apparatus for a field emission display, that is capable of highly accurately and highly productively forming the sharp emitters orderly aligned without a complicate manufacturing step and a complicate optical system.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A method for manufacturing a field emission display, comprising the step of:
   (1a) forming a transparent conductive film on a substrate that is to be a base plate, the transparent conductive film being for forming a cathode electrode;
   (2a) applying a photosensitive material on the transparent conductive film;
   (3a) exposing the photosensitive material to light, so as to form openings that correspond in a shape of emitters, the light being (a) emitted from a light source, (b) paralleled so that rays thereof have even light intensity distribution, and (c) directed into a micro lens array so as to be condensed in interior of the photosensitive material; and
   (4a) forming the emitters respectively in the openings.

2. The method as set forth in claim 1, wherein:
the photosensitive material is a positive resist.

3. The method as set forth in claim 1, wherein:
the micro lens array is located between the light source and the substrate that is transparent, so as to expose the photosensitive material to the light directed thereto from above the substrate.

4. A method for manufacturing a field emission display, comprising the steps of:
   (1b) forming, on a substrate to be a base plate, a conductive film from which a cathode electrode is to be formed, and forming, on the conductive film, an emitter formation layer from which emitters are to be formed;
   (2b) applying a photosensitive material on the emitter formation layer;
   (3b) exposing the photosensitive material to light so as to form pre-emitter shapes that correspond to a shape of the emitters and are to be emitters, the light being (a) emitted from a light source, (b) paralleled so that rays thereof have even light intensity distribution, (c) directed into a micro lens array so as to be condensed in interior of the photosensitive material so that the photosensitive material is given intensity distribution that corresponds to the shape of the emitters;
   (4b) performing development so as to remove the photosensitive material and bare the pre-emitter shapes on the emitter formation layer; and
   (5) transferring the pre-emitter shapes to the emitter formation layer.

5. The method as set forth in claim 4, wherein:
the photosensitive material is a negative resist.

6. The method as set forth in claim 4, wherein:
the transferring of step (5) is carried out by dry etching; and
selection ratio of the emitter formation layer with respect to the photosensitive material in the etching is more than 1.

7. The method as set forth in claim 4, wherein:
the micro lens array is located between the light source and the substrate that is transparent, so as to expose the photosensitive material to the light directed thereto from above the substrate.

8. The method as set forth in claim 4, wherein:
the conductive film is a transparent conductive film, and the emitter formation layer is a transparent insulating film,
the method further comprising, after the transferring of step (5):
   (6) forming the emitters by depositing a conductive material onto the pre-emitter shapes formed from the transparent insulating film.

9. The method as set forth in claim 4, wherein:
both of the conductive film and the emitter formation layer are transparent conductive films; and
the emitters are formed by, in step (5), transferring the pre-emitter shapes to the emitter formation layer formed from the transparent conductive film.

10. The method as set forth in claim 4, wherein:
the micro lens array is located between the light source and the photosensitive material applied on the substrate, so as to expose the photosensitive material to the light directed thereto from above the photosensitive material.

11. The method as set forth in claim 10, wherein:
the emitter formation layer is a conductive film; and
in step (5), the pre-emitter shapes are transferred to the conductive film so as to form the emitters.

12. The method as set forth in claim 4, wherein:
the micro lens array has intervals between each of lens portions;
the lens portions condense, in the interior of the photosensitive material, the light emitted from the light source, so as to form the pre-emitter shapes; and
the intervals is a flat portion for letting the light pass therethrough so as to form shapes of an insulating layer.

13. The method as set forth in claim 12, wherein:
the conductive film is a transparent conductive film and the emitter formation layer is a transparent insulating film; and
after the step (5), a conductive material is deposited from above the transparent insulating film, so as to form the emitters and a gate electrode film.

14. A method of manufacturing a field emission display, comprising the steps of:
(7) (i) forming, on a substrate to be a base plate, a conductive film from which a cathode electrode is to be formed, (ii) forming, on the conductive film, an emitter formation layer from which emitters are to be formed, and (iii) forming a catalyst layer from which a carbon nanotube is to be formed on the emitter formation layer;
(8) applying a photosensitive material on the catalyst layer;
(9) exposing the photosensitive material to light so as to form pre-emitter shapes that correspond to a shape of the emitters and are to be emitters, the light being (a) emitted from a light source, (b) paralleled so that rays thereof have even light intensity distribution, (c) directed into a micro lens array so as to be condensed in interior of the photosensitive material so that the photosensitive material is given intensity distribution that corresponds to the shape of the emitters;
(10) performing development so as to remove the photosensitive material and bare the pre-emitter shapes on the catalyst layer;
(11) transferring the pre-emitter shapes to the emitter formation layer and the catalyst layer; and
(12) forming the carbon nanotube on the catalyst layer.

15. The method as set forth in claim 14, wherein:
the emitter formation layer is a conductive film, and the catalyst layer is a metal thin layer; and
in the step (11), the pre-emitter shapes are transferred to the conductive film and the metal thin film, so that peak portions of the emitters are formed from the catalyst layer.

* * * * *